(12) United States Patent
Onishi et al.

(10) Patent No.: US 11,208,269 B2
(45) Date of Patent: Dec. 28, 2021

(54) ABNORMALITY DETECTING SYSTEM, ABNORMALITY DETECTING APPARATUS, ABNORMALITY DETECTING METHOD, COMPUTER PROGRAM, AND CHAIN

(71) Applicant: Tsubakimoto Chain Co., Osaka (JP)

(72) Inventors: Tomohiko Onishi, Osaka (JP); Hirokazu Sano, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 32 days.

(21) Appl. No.: 16/643,157

(22) PCT Filed: Aug. 31, 2018

(86) PCT No.: PCT/JP2018/032332
§ 371 (c)(1),
(2) Date: Feb. 28, 2020

(87) PCT Pub. No.: WO2019/045043
PCT Pub. Date: Mar. 7, 2019

(65) Prior Publication Data
US 2020/0346874 A1 Nov. 5, 2020

(30) Foreign Application Priority Data
Sep. 1, 2017 (JP) .............................. JP2017-168989

(51) Int. Cl.
*B65G 43/02* (2006.01)
*B65G 43/00* (2006.01)
(Continued)

(52) U.S. Cl.
CPC ............. *B65G 43/02* (2013.01); *B65G 17/38* (2013.01); *B65G 23/06* (2013.01);
(Continued)

(58) Field of Classification Search
CPC ......... B65G 17/38; B65G 43/00; B65G 43/02
(Continued)

(56) References Cited

U.S. PATENT DOCUMENTS

| | | | | |
|---|---|---|---|---|
| 6,047,814 A | * | 4/2000 | Alles ..................... | B65G 43/02 198/810.02 |
| 7,624,857 B2 | * | 12/2009 | Kusel ..................... | B65G 43/02 198/502.4 |

(Continued)

FOREIGN PATENT DOCUMENTS

| | | |
|---|---|---|
| CN | 1497241 A | 5/2004 |
| JP | 61-139913 U | 8/1986 |

(Continued)

OTHER PUBLICATIONS

International Search Report dated Nov. 20, 2018, issued in counterpart International Application No. PCT/JP2018/032332. (2 pages).

(Continued)

*Primary Examiner* — Douglas A Hess
(74) *Attorney, Agent, or Firm* — Westerman, Hattori, Daniels & Adrian, LLP

(57) ABSTRACT

Provided are an abnormality detection system, an abnormality detection device, an abnormality detection method, a computer program, and a chain that enable detecting of an abnormality not only in a chain but also in equipment using the chain while distinguishing the location at which the abnormality occurs. The abnormality detecting system comprises a sensor unit comprising a sensor, to be fixed to a chain that is to be attached to equipment, and transmitting an output from the sensor, a detection section which detects an abnormality of the chain or the equipment based on the output, and a determining section which determines a location of the abnormality in the equipment, based on a position of a part fixed with the sensor unit in the equipment, the
(Continued)

position changes in each time point with moving of the chain.

16 Claims, 22 Drawing Sheets

(51) Int. Cl.
*B65G 17/38* (2006.01)
*B65G 23/06* (2006.01)

(52) U.S. Cl.
CPC ............. *B65G 2203/0275* (2013.01); *B65G 2203/041* (2013.01); *B65G 2203/042* (2013.01); *B65G 2812/02099* (2013.01); *B65G 2812/02287* (2013.01)

(58) Field of Classification Search
USPC ........................................... 198/502.1, 502.4
See application file for complete search history.

(56) References Cited

U.S. PATENT DOCUMENTS

| | | | | |
|---|---|---|---|---|
| 8,177,051 | B2* | 5/2012 | Alport | B65G 43/02 198/810.02 |
| 8,285,494 | B2* | 10/2012 | Vozner | G01B 11/14 702/34 |
| 8,657,105 | B2* | 2/2014 | Twigger | B65G 43/02 198/810.01 |
| 9,139,376 | B2* | 9/2015 | Andreoli | B65G 43/04 |
| 9,227,791 | B2* | 1/2016 | DePaso | B65G 43/00 |
| 9,746,385 | B2* | 8/2017 | Kar | G01L 1/16 |
| 9,776,799 | B2* | 10/2017 | Ulchak | B65G 43/02 |
| 10,023,397 | B1* | 7/2018 | Brown | B65G 43/00 |
| 10,294,080 | B2* | 5/2019 | Lustenberger | G01P 13/045 |
| 10,488,282 | B2* | 11/2019 | Guru | B65G 43/02 |
| 10,801,902 | B2* | 10/2020 | Kleczewski | G01G 7/00 |
| 2011/0198194 | A1 | 8/2011 | Tokhtuev et al. | |

FOREIGN PATENT DOCUMENTS

| | | | |
|---|---|---|---|
| JP | 6-289046 | A | 10/1994 |
| JP | 9-145736 | A | 6/1997 |
| JP | 2000-88526 | A | 3/2000 |
| JP | 2007-40851 | A | 2/2007 |
| JP | 2007-261066 | A | 10/2007 |
| JP | 2008-237984 | A | 10/2008 |
| JP | 2009-107148 | A | 5/2009 |
| JP | 2009-300243 | A | 12/2009 |
| JP | 2012-148844 | A | 8/2012 |
| JP | 2017-36933 | A | 2/2017 |

OTHER PUBLICATIONS

Office Action dated Feb. 1, 2021, issued in counterpart CN Application No. 201880056608.2, with English translation (17 pages).
Hexing, Wang et al., "Internet of Things Engineering—Introduction", Northeastern University Press, Jan. 18, 2021, with English translation (8 pages); Cited in CN Office Action dated Feb. 1, 2021.
Office Action dated Sep. 14, 2021, issued in counterpart CN Application No. 201880056608.2, with Machine English translation (25 pages).
Zhongli, Ma. et al. "Sensor and signal detection and conversion technology"; Harbin Engineering University Press, Oct. 2016 pp. 56-57, (concise explanation in English is on p. 12 of the translation of the CN Office Action, specifically the middle part), cited in CN Office Action dated Sep. 14, 2021 (5 pages).

\* cited by examiner

F I G. 4
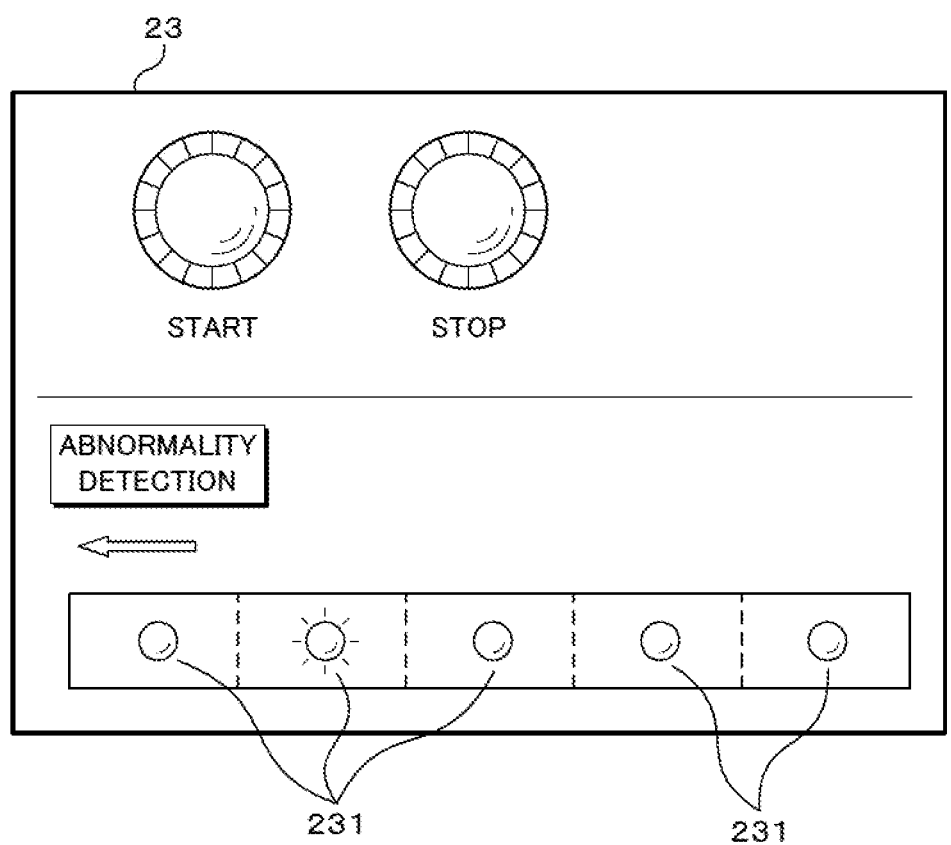

A CONVEYOR CHAIN

B SPROCKET WHEEL

C4

ABNORMALITY DETECTING SYSTEM, ABNORMALITY DETECTING APPARATUS, ABNORMALITY DETECTING METHOD, COMPUTER PROGRAM, AND CHAIN

CROSS-REFERENCE TO RELATED APPLICATIONS

This application is the national phase under 35 U. S. C. § 371 of PCT International Application No. PCT/JP2018/032332 which has an International filing date of Aug. 31, 2018 and designated the United States of America.

FIELD

The present invention relates to an abnormality detection of equipment in which a chain is used.

BACKGROUND

Many systems are proposed that detect an abnormality of equipment by means of a temperature sensor, a humidity sensor or an atmospheric pressure sensor which measures an operating environment of equipment, and a velocity sensor or an acceleration sensor which detects a movement of equipment, and the like.

Japanese Patent Application Laid-Open Publication No. 2009-107148 discloses a method of detecting, at a tenter including a clip chain in which tenter clips running on a tenter rail are connected, an abnormality such as backlash, slackness, tilt of the tenter rail by means of a sensor located in the tenter clip. In the method disclosed in Patent Document 1, a vibrometer is used as the sensor, and whether an abnormality such as backlash occurs in the tenter rail is detected from a change in an output of the vibrometer during running on the tenter rail.

SUMMARY

In the disclosed method, a vibrometer is used as the sensor, and whether an abnormality such as backlash occurs in the tenter rail is detected from a change in an output of the vibrometer during running on the tenter rail.

In the disclosed method, an abnormality of the tenter rail is detected, but the detection of the abnormality of the tenter rail is not taken into consideration as distinguished from a detection of an abnormality of the clip chain itself.

The present disclosure has been made in view of the circumstances described above, and aims to provide an abnormality detecting system, an abnormality detecting apparatus, an abnormality detecting method, a computer program, and a chain, which are capable of detecting an abnormality of not only a chain but also the whole equipment in which the chain is used while distinguishing a location of the abnormality.

An abnormality detecting system according to the present disclosure, comprises: a sensor which is an acceleration sensor or an angular velocity sensor to be fixed to a chain that is to be attached to equipment; a detection section which detects an abnormality of the chain or the equipment based on an output sent from the sensor; and a determining section which determines a location of the abnormality detected by the detection section.

In an abnormality detecting system according to the present disclosure, the determining section determines a location of the abnormality based on a position of a location where the sensor is fixed in the equipment in each time point.

An abnormality detecting system according to the present disclosure, further comprises: a position-data obtaining section which obtains data for determining a position of the sensor; a wireless communication section which transmits an output sent from the sensor and data obtained by the position-data obtaining section by means of a wireless signal; and a central device which receives the output and data transmitted by the wireless communication section. In the abnormality detecting system, the central device comprises: the detection section which detects an abnormality of the chain or the equipment based on the output transmitted by the wireless communication section; and the determining section which determines a location of the abnormality detected by the detection section based on the data transmitted by the wireless communication section.

In an abnormality detecting system according to the present disclosure, the detection section and the determining section as well as a wireless communication section which transmits a wireless signal towards another device are fixed to the chain along with the sensor, and when the detection section detects an abnormality, the wireless communication section transmits the detected abnormality and the determined location.

An abnormality detecting system according to the present disclosure, further comprises an abnormality output section which outputs an abnormality detected by the detection section in association with a location determined by the determining section.

In an abnormality detecting system according to the present disclosure, the sensors are an acceleration sensor and an angular velocity sensor, and the detection section detects an abnormality based on an output sent from the acceleration sensor or on an output sent from the angular velocity sensor.

In an abnormality detecting system according to the present disclosure, a strain detection section which detects a strain of the chain is provided along with the sensor, and the detection section detects an abnormality based on an output sent from the sensor or on an output sent from the strain detection section.

In an abnormality detecting system according to the present disclosure, a temperature sensor is provided along with the sensor, and the detection section detects an abnormality based on an output sent from the sensor or on an output sent from the temperature sensor.

In an abnormality detecting system according to the present disclosure, an imaging section is provided along with the sensor, and the detection section detects an abnormality based on an output sent from the sensor or on an image or a video sent from the imaging section.

In an abnormality detecting system according to the present disclosure, a sound sensor is provided along with the sensor, and the detection section detects an abnormality based on an output sent from the sensor or on an output sent from the sound sensor.

In an abnormality detecting system according to the present disclosure, a sensor which is an acceleration sensor or an angular velocity sensor is provided in a sprocket wheel which feeds the chain, and the detection section distinctively detects an abnormality of the chain, the equipment or the sprocket wheel based on an output sent from the sensor fixed to the chain and on an output sent from the sensor provided in the sprocket wheel.

In an abnormality detecting system according to the present disclosure, the abnormality output section outputs a location of an abnormality in the equipment by means of light.

An abnormality detecting apparatus according to the present disclosure, comprises: an obtaining section which obtains an output sent from a sensor being an acceleration sensor or an angular velocity sensor fixed to a chain attached to equipment; a detection section which detects an abnormality of the chain or the equipment based on the output obtained by the obtaining section; a determining section which determines a location of the detected abnormality based on a position of a location where the sensor is fixed in the equipment in each time point; and an abnormality output section which outputs the abnormality detected by the detection section in association with the location determined by the determining section.

An abnormality detecting method according to the present disclosure, comprises processes of: obtaining an output sent from a sensor which is an acceleration sensor or an angular velocity sensor fixed to a chain attached to equipment; detecting an abnormality of the chain or the equipment based on the obtained output; determining a location of the detected abnormality based on a position of a location where the sensor is fixed in the equipment in each time point; and outputting the detected abnormality in association with the determined location.

A computer program according to the present disclosure, causes a computer to perform processes of: obtaining an output sent from a sensor which is an acceleration sensor or an angular velocity sensor fixed to a chain attached to equipment; detecting an abnormality of the chain or the equipment based on the obtained output; determining a location of the detected abnormality based on a position of a location where the sensor is fixed in the equipment in each time point; and outputting the detected abnormality in association with the determined location.

A chain according to the present disclosure, is fixed with a sensor which is an acceleration sensor or an angular velocity sensor, comprises: an obtaining section which obtains data for determining its own position; and a processing section which stores or outputs outwards an output sent from the sensor in association with the data.

In one aspect of this disclosure, a sensor which is an acceleration sensor or an angular velocity sensor is fixed to a chain, and an output thereof is analyzed, which determines a location (factor) of an abnormality while targeting at not only the chain but also equipment in which the chain is attached. The use of the chain to which such a sensor is fixed allows the detection of an abnormality whose location is determined.

In one aspect of this disclosure, a location of an abnormality is determined based on a position of a location where the sensor being the acceleration sensor or the angular velocity sensor is fixed to the chain in each time point. A position of a link to which the sensor is fixed can be determined by means of a feed position of the chain or by means of an electric wave receiver provided along with the sensor, etc.

In one aspect of this disclosure, a central device receives an output sent from the sensor which is the acceleration sensor or the angular velocity sensor, and on a side of the central device an abnormality is detected and a location of the abnormality is determined. For this reason, to the chain attached are a position-data obtaining section which obtains data for determining a position where the acceleration sensor is fixed, such as a GPS (Global Positioning System) receiving section, a reader of a wireless tag (for example, RFID: Radio Frequency ID), and a wireless communication section which transmits this data.

In one aspect of this disclosure, the detection section and the determining section which are fixed on the chain detects an abnormality and determines a location of the abnormality respectively, and the detection result of the abnormality is transmitted over the wireless. A special device is not required to be prepared separately only by attaching to the chain the sensor which is the acceleration sensor or the angular velocity sensor including the detection section and the determining section and preparing a device which receives a transmitted notice result of an abnormality.

In one aspect of this disclosure, the detected abnormality is outputted in association with a location of the abnormality. The output may be performed by a display panel for which a liquid crystal panel etc. is used, a lamp display, a log output, etc. The location of the abnormality is outputted together, which reduces an effort required to check an abnormality.

In one aspect of this disclosure, both of the acceleration sensor and the angular velocity sensor are provided. The sensors which measure different physical quantities are used together, which allows a high-precision detection of more various abnormalities of not only the chain itself but also the equipment to which the chain is attached and the periphery thereof.

In one aspect of this disclosure, a strain detection section is also provided in addition to the acceleration sensor or the angular velocity sensor. The strain detection section is used together, which allows a high-precision detection of more various abnormalities of not only the chain itself but also the equipment to which the chain is attached and the periphery thereof.

In one aspect of this disclosure, a temperature sensor is also provided in addition to the acceleration sensor or the angular velocity sensor. The temperature sensor is used together, which allows a high-precision detection of more various abnormalities of not only the chain itself but also the equipment to which the chain is attached and the periphery thereof.

In one aspect of this disclosure, an imaging section is also provided in addition to the acceleration sensor or the angular velocity sensor. The imaging section is used, which can visually capture an operation state of not only the chain itself but also a portion that a person cannot enter in the equipment to which the chain is attached and the periphery thereof, and thereby allow the detection of various abnormalities and the check of the abnormalities.

In one aspect of this disclosure, a sound sensor is also provided in addition to the acceleration sensor or the angular velocity sensor. The sound sensor is used together, which allows a high-precision detection of more various abnormalities of not only the chain itself but also the equipment to which the chain is attached and the periphery thereof.

In one aspect of this disclosure, an acceleration sensor or an angular velocity sensor is provided also in the sprocket wheel which feeds the chain in addition to the acceleration sensor or the angular velocity sensor which is fixed to the chain. The sensors are provided in the chain which continues moving and in the sprocket wheel which performs a rotational movement but whose absolute position is not changed, respectively, which improves accuracy of the detection of an abnormality whose location is determined.

In one aspect of this disclosure, the output of abnormality detection and a location of the abnormality are realized by the display panel or the output of light by a lamp etc. An abnormality is notified visually.

In a case of the abnormality detection system of this disclosure, it is possible to determine and detect a location (factor) of an abnormality of not only the chain itself but also the whole equipment in which the chain is used, based on the sensor being the acceleration sensor or the angular velocity sensor which is fixed to the chain which continues moving in the equipment.

The above and further objects and features will more fully be apparent from the following detailed description with accompanying drawings.

BRIEF DESCRIPTION OF DRAWINGS

FIG. 4 is a schematic view showing an example of contents of an operation panel.

DETAILED DESCRIPTION

The present disclosure will be specifically described with reference to the drawings showing Embodiments thereof.

Embodiment 1

Figure 1:
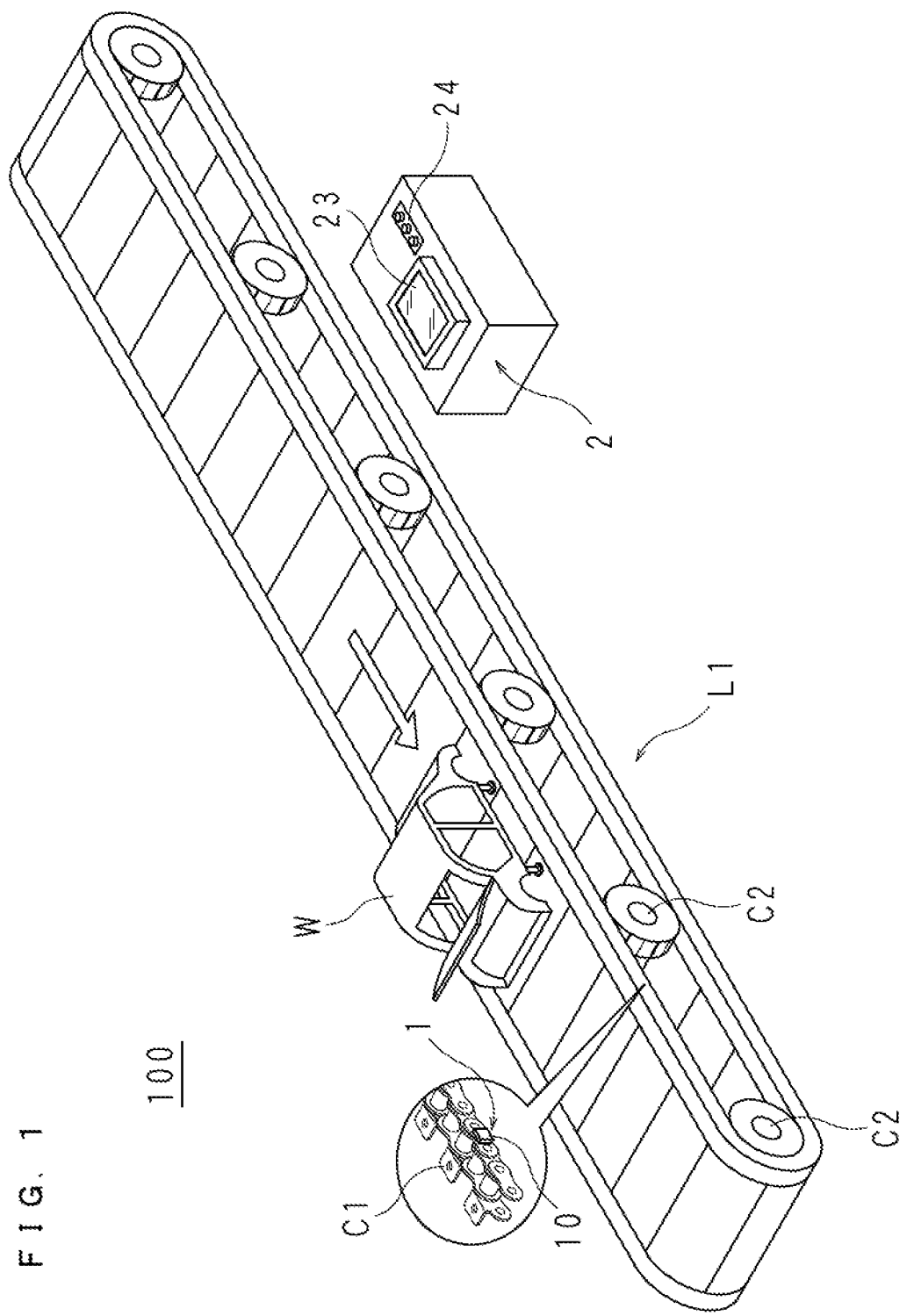
FIG. 1 is an explanatory drawing explaining an outline of an abnormality detection system of this disclosure.

FIG. 1 is an explanatory drawing explaining an outline of an abnormality detection system 100 of this disclosure. The abnormality detection system 100 in Embodiment 1 targets at a production line L1 of a factory as an object of an abnormality detection. The production line L1 of the factory is a conveying device which conveys a work W (for example, an automobile). The conveying device is provided with a conveyor chain C1 to which a belt is attached, and with a sprocket wheel C2 which feeds the conveyor chain C1. The length of the conveying device ranges from 100 meter to hundreds of meters, for example. The abnormality detection system 100 comprises a sensor unit 1 attached to an outer link plate of the conveyor chain C1, and a center console 2 which controls an operation of the conveying device. In the abnormality detection system 100, the center console 2 receives an output sent from the sensor unit 1 attached to the conveyor chain C1, to detect an abnormality of not only the conveyor chain C1 but also the sprocket wheel C2 or other portions of the conveying device.

Figure 2:
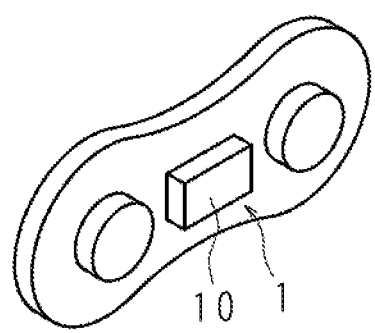
FIG. 2 is an enlarged view of a sensor unit in FIG. 1.

FIG. 2 is an enlarged view of the sensor unit 1 in FIG. 1. A case 10 of the sensor unit 1 has a rectangular parallelepiped shape, and is fixed to an outer surface of a specific outer link plate of the conveyor chain C1. Note that it is preferable that the case 10 has a size to fit between pins of the link plate as shown in FIG. 2, and a thickness similar to a projection length of the pin. As a method of fixing the case 10 to the link plate, various methods are employed according to the object of the abnormality detection and a standard of the conveyor chain C1. For example, the case 10 may be attached to the link plate by means of a magnet fixed to the case 10, or may be adhered to the link plate with an adhesive. Alternatively, the case 10 may be fixed to the link plate by means of a bolt and a nut. The case 10 may be attached by means of a pin or an attachment. It is desirable that the case 10 can be easily attached and is not dismounted by a movement of the conveyor chain C1 as much as possible.

Figure 3:
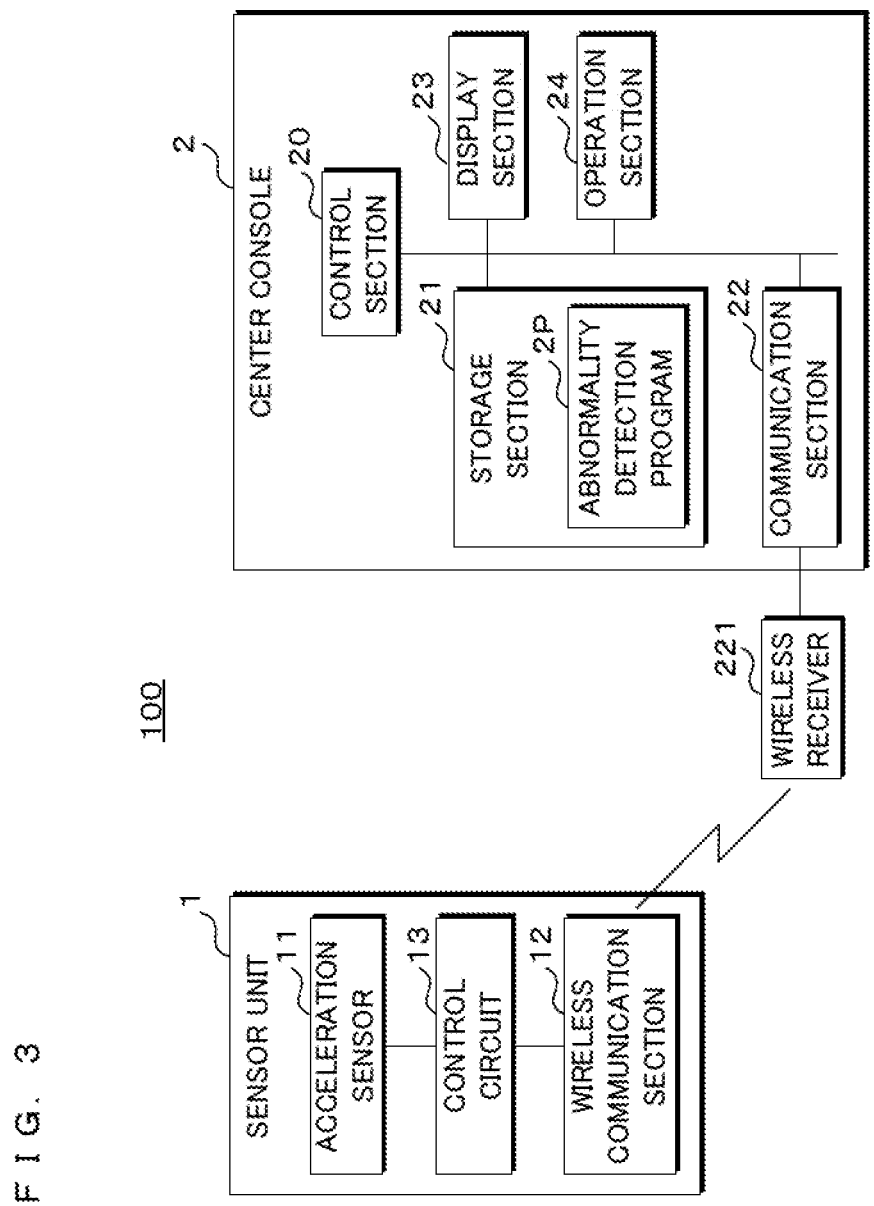
FIG. 3 is a block diagram showing a configuration of the abnormality detection system.

FIG. 3 is a block diagram showing a configuration of the abnormality detection system 100. The sensor unit 1 is provided with an acceleration sensor 11, a wireless communication section 12 and a control circuit 13 in the case 10. An orthogonal triaxial sensor is used for the acceleration sensor 11, for example. The acceleration sensor 11 is located so as to correspond to orthogonal three sides of the rectangular-parallelepiped-shaped case 10.

The wireless communication section 12 modulates a signal given from the control circuit 13 and transmits the modulated signal as a wireless signal by means of a wireless communication device such as a Wi-Fi or a Bluetooth (registered trademark). Moreover, the wireless communication section 12 is required to be a device which allows a wireless data communication realizing that the wireless communication section 12 communicates with other equipment such as a center console while the sensor unit 1 moves, and the wireless communication section 12 may be a device in which an infrared data communication is used.

The control circuit 13 is provided with a power supply section and a microcomputer. The power supply section uses a battery as a power source to supply electric power to not only the microcomputer but also each composition part of the sensor unit 1. The microcomputer of the control circuit 13 is connected via signal lines with the acceleration sensor 11 and the wireless communication section 12. The microcomputer receives an output sent from the acceleration sensor 11, samples a signal level of the output at a predetermined cycle and regularly transmits the read signal level as data from the wireless communication section 12 towards the center console 2.

The sensor unit 1 configured in this way is fixed such that one side of the three sides of the case 10 extends on a specific link plate in a length direction of the chain, as shown in FIG. 1. For this reason, the acceleration sensor 11 is located such that two axes of three axes thereof are oriented in a feed direction of the conveyor chain C1 and in a direction orthogonal to a rotation axis of a folded portion of the conveyor chain C1, respectively.

A server computer is used for the center console 2, and the center console 2 is provided with a control section 20, a storage section 21, a communication section 22, a display section 23 and an operation section 24. The center console 2 is connected with a drive control section (not shown) for the conveying device as described above to control the conveying device. Note that the center console 2 is not limited to the server computer and may be a device that a microcomputer is used.

The control section 20 is provided with a CPU, a built-in ROM and a RAM to control each composition part. The control section 20 is connected with the above-described drive control section, and is capable of sending a signal instructing on an operation to the drive control section and determining a feed position (pulse number) of the conveyor chain C1 based on a signal sent from the drive control section.

A non-volatile memory such as a hard disk or a flash memory is used for the storage section 21. The storage section 21 stores an abnormality detection program 2P. The storage section 21 also stores information for performing an abnormality detection (an abnormality feature amount). In addition, the storage section 21 stores information to be referred by the control section 20. The control section 20 reads the information stored in the storage section 21 and stores generated information in the storage section 21.

For the communication section 22, a wireless communication module of a wireless communication standard corresponding to the sensor unit 1 is used, or the communication section 22 receives a signal from an external wireless receiver. The communication section 22 receives a signal transmitted from the sensor unit 1 over the wireless or via the wireless receiver 221, as shown in FIG. 3.

A liquid crystal panel is used for the display section 23, and the display section 23 displays a control interface of the conveying device based on a control signal sent from the control section 20. Moreover, the display section 23 includes lamps located on an operation panel containing buttons and lamps. FIG. 4 is a schematic view showing an example of contents of the operation panel. As shown in FIG. 4, the operation panel includes the lamps 231 showing operation states for a plurality of parts into which the conveying device extending hundreds of meters is separated. When this lamp 231 illuminates blue, the lamp 231 indicates that the operation state of that part is normal, and when the lamp 231 illuminates red, the lamp 231 indicates that the operation state of that part is abnormal or is a state predicted to be abnormal. For the operation section 24, buttons located on the operation panel or a touch panel incorporated in the display section 23 and the like is used. The operation section 24 notifies the control section 20 of operation contents and the control section 20 can detect the operation contents.

Figure 5:
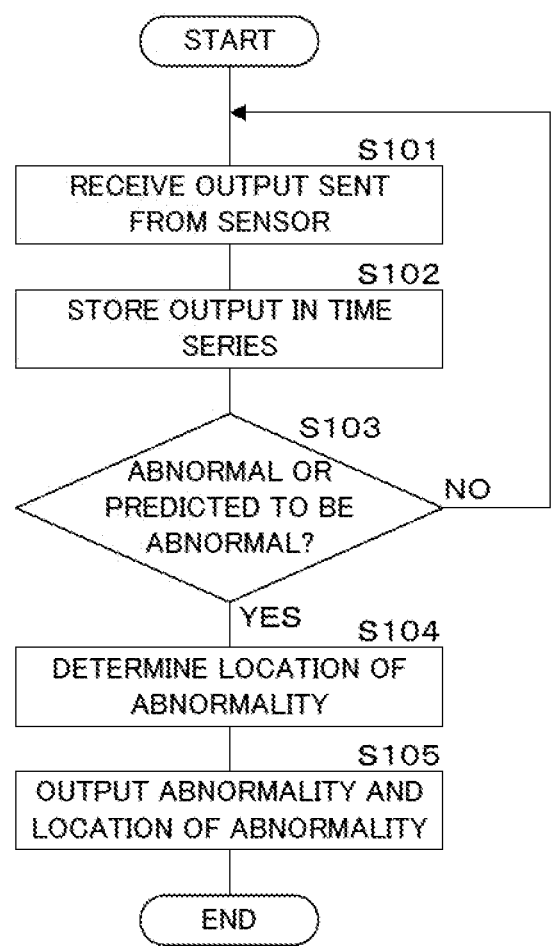
FIG. 5 is a flowchart showing one example of a process procedure of an abnormality detection of a conveying device in Embodiment 1.

In the center console 2 configured in this way, the control section 20 functions as a detection section which detects an abnormality based on the abnormality detection program 2P, in a process procedure as described below. FIG. 5 is a flowchart showing one example of the process procedure of the abnormality detection of the conveying device in Embodiment 1. The control section 20 receives from the sensor unit 1 an output sent from the triaxial sensor of the acceleration sensor 11 (Step S101) and stores the output of each axis in a built-in memory in time series (Step S102). Note that the storage in the built-in memory is preferably performed in an overwrite mode cyclically. The control section 20 refers to a feature amount for detecting an abnormality which is stored in the storage section 21 relative to the output of each axis in a predetermined period which is stored at Step S102, and judges whether or not the output is abnormal or is an output predicted to be abnormal (Step S103). Note that the judgment at Step S103 may be performed using as a trigger a case where there is a predetermined change in the output of each axis (a case where constant acceleration changes to acceleration varying linearly, or a case where acceleration changes periodically and in pulse) and the like.

When the control section 20 judges that the output is abnormal or is an output predicted to be abnormal (S103: YES), the control section 20 detects an abnormality thereby to determine a location of the abnormality (Step S104). The control section 20 determines the location of the abnormality as the whole conveyor chain C1 at Step S104. In addition, the control section 20 determines as the location of the abnormality a position of the sensor unit 1 existing at the timing corresponding to the output judged to be an abnormality. In Embodiment 1, the control section 20 can determine the location of the abnormality based on a position of the specific link in which the sensor unit 1 is provided in the conveyor chain C1 (the position is prestored in the storage section 21) and on a feed position of the sprocket wheel C2 obtained from the drive control section. When the control section 20 can judge that a bite occurs by the analysis of the output sent from the acceleration sensor 11 as described below for example, the control section 20 can determine a location where an abnormality has occurred from a position of the sensor unit 1. In addition, when an occurrence of a displacement of an alignment is detected, the control section 20 may determine a whole of a plurality of sprocket wheels C2 concerning the displacement as a location of an abnormality detection.

The control section 20 causes the lamp corresponding to the location of the abnormality determined at Step S104 among the parts of the conveying device to illuminate red (output light) (Step S105), and ends the process. Note that in this case the control section 20 preferably returns the process to Step S101 and repeatedly performs the process continuously. When the control section 20 detects a stretch of the whole chain as the part of the conveying device to be an abnormality, the control section preferably causes the lamp corresponding to the chain to illuminate. Moreover, at Step S105 the control section may cause the liquid crystal panel of the display section 23 to output an abnormality detection by means of a character or an image, or may output an abnormality detection as a log in the storage section 21 instead of the display section 23.

When the control section 20 judges at Step S103 that the output is not abnormal or is not an output predicted to be abnormal (S103: NO), the control section 20 returns the process to Step S101 and continues the reception of an output, the storage of each output, and the detection of an abnormality based on the stored output.

Figure 6A:
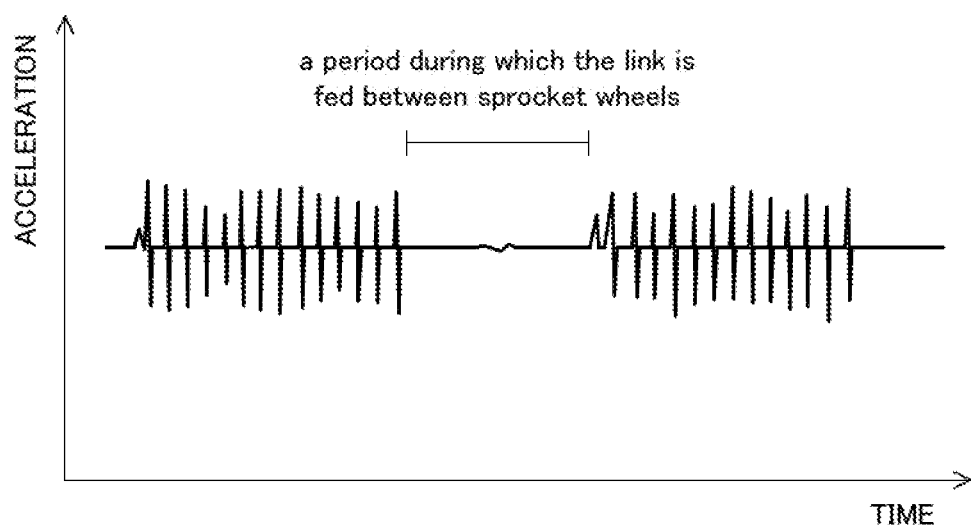
FIG. 6A is an explanatory drawing explaining an example of contents of a sensor output judged to be the abnormality detection.
Figure 6B:
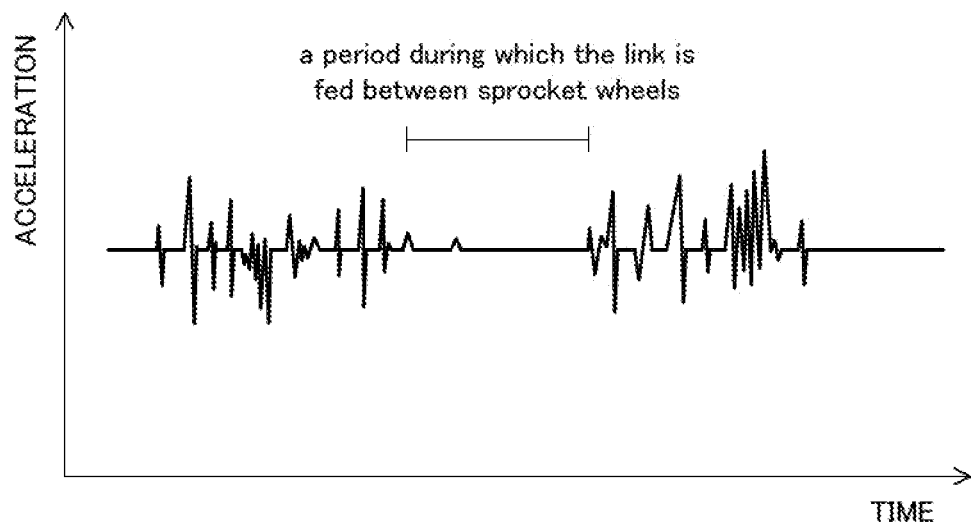
FIG. 6B is an explanatory drawing explaining an example of contents of a sensor output judged to be the abnormality detection.

The following shows and explains one example about the abnormality detection at Step S103. The acceleration sensor 11 of the sensor unit 1 is used, which allows the detection of a pitch stretch of the conveyor chain C1 for example as the detection of an abnormality or the detection of prediction of an abnormality. FIGS. 6A and 6B are explanatory drawing explaining an example of contents of a sensor output judged to be the abnormality detection. FIGS. 6A and 6B are graphs obtained by plotting and connecting sensor outputs in the axis extending in an up-and-down direction of the acceleration sensor 11 relative to time course, FIG. 6A shows one example of a waveform in a normal condition, and FIG. 6B shows one example of a waveform in an abnormal condition. As shown in FIG. 6A, a vibration of the link in the up-and-down direction (approximately vertical direction) is nearly zero at the timing at which the link corresponding to the link plate to which the sensor unit 1 is attached engages with the sprocket wheel C2. The link vibrates in the up-and-down direction at a constant cycle at the timing at which the link is fed between the sprocket wheels C2, as shown in the waveform of FIG. 6A, and a cycle (pulse interval) thereof is constant. To the contrary, as shown in FIG. 6B, it is known by an experiment that a vibration cycle is not constant at the timing at which the link is fed between the sprocket wheels C2 in a state where the conveyor chain C1 stretches 1%, for example. Thus, the occurrence of the pitch stretch of the conveyor chain C1 can be detected from a pattern of the outputs sent from the acceleration sensor 11 corresponding to the vibration in the up-and-down direction.

That is, a frequency analysis is performed on an output sent from the acceleration sensor 11, which can judge that some kind of abnormality occurs when a vibration of a different interval is obtained from the output except a vibration at a frequency according to a pitch of the conveyor chain C1. In addition, it is possible to detect as an abnormality of the conveying device by the acceleration sensor 11 a case in which the conveyor chain C1 bites a foreign matter, a case in which surging (also called a stick slip) occurs, a case in which an oil dries out and the like, for example. Moreover, a vibration at a frequency corresponding to a rotation cycle of the sprocket wheel C2 is also taken in consideration, which can detect as an abnormality an abnormality of a tooth in each of the sprocket wheels C2, an occurrence of a displacement of an alignment between the sprocket wheels C2 and the like, for example. Thus, the sensor unit 1 including the acceleration sensor 11 is fixed to the conveyor chain C1 which continues moving in the equipment, which can determine and detect a location (factor) of an abnormality while targeting at not only the conveyor chain C1 but also the whole conveying device in which the conveyor chain C1 is used.

Note that the sensor unit 1 may detect an abnormality from a cycle of a vibration, etc. by means of an angular velocity sensor instead of the acceleration sensor 11. Moreover, the sensor unit 1 may store an output sent from a sensor being the basis of the detected abnormality in association with time information by means of a non-volatile storage medium instead of the wireless communication section 12.

Embodiment 2

Figure 7:
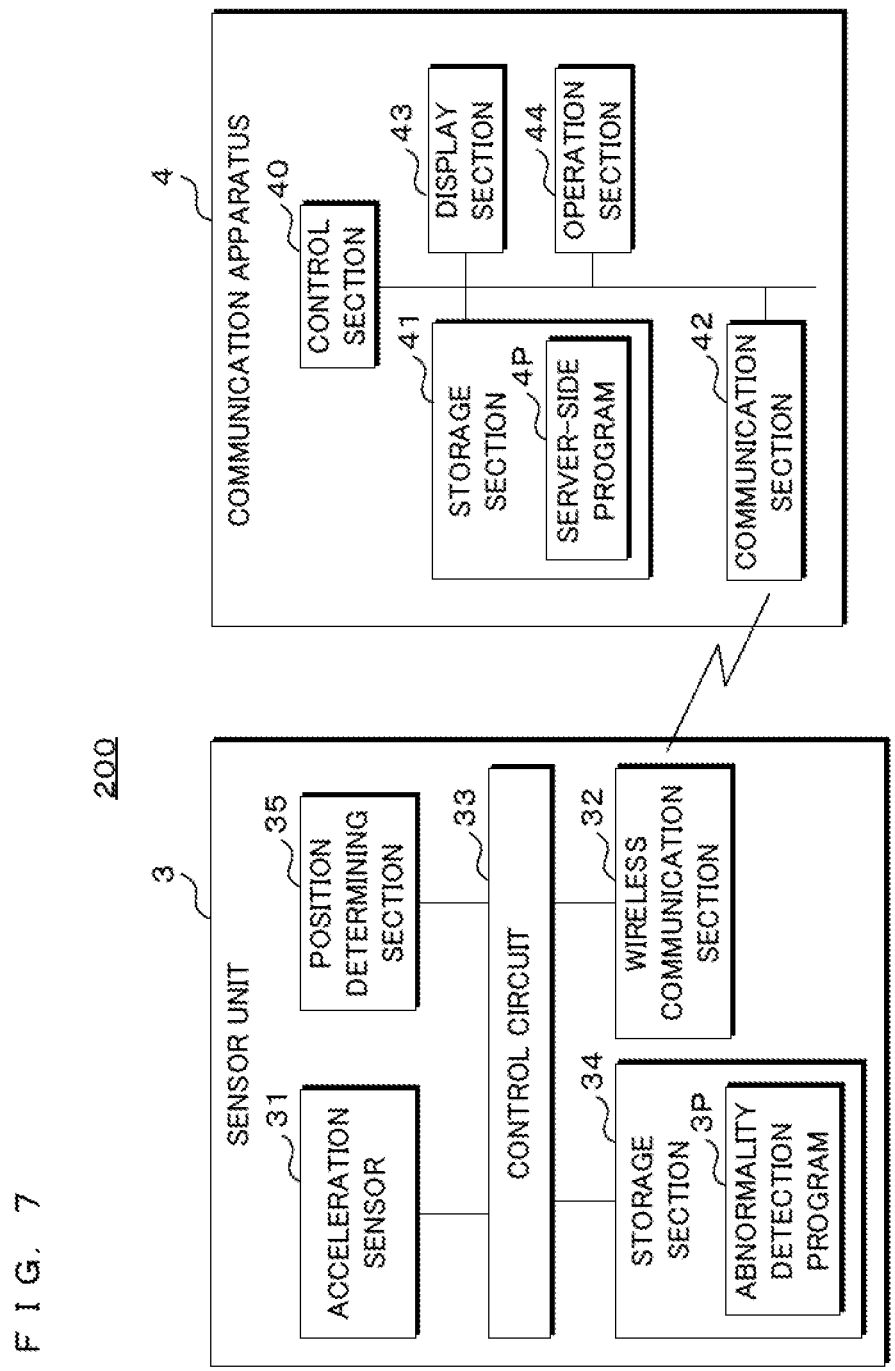
FIG. 7 is a block diagram showing a configuration of an abnormality detection system in Embodiment 2.

FIG. 7 is a block diagram showing a configuration of an abnormality detection system 200 in Embodiment 2. In Embodiment 2, the abnormality detection system 200 comprises a sensor unit 3 attached to a link plate of the conveyor chain C1, and a communication apparatus 4. In the abnormality detection system 200, the sensor unit 3 attached to the conveyor chain C1 detects an abnormality and the communication apparatus 4 receives the detected abnormality and outputs the same.

For this reason, the sensor unit 3 determines its own position and also detects an abnormality by itself. The sensor unit 3 is provided with an acceleration sensor 31, a wireless communication section 33, a control circuit 33, a storage section 34 and a position determining section 35 in a case 30. The case 30 has a rectangular parallelepiped shape, and is fixed to one specific link plate of the conveyor chain C1.

The following omits a detailed explanation because the acceleration sensor 31 and the wireless communication section 32 are the same as the acceleration sensor 11 and the wireless communication section 12 provided in the sensor unit 1 in Embodiment 1, respectively.

A non-volatile memory such as a flash memory or an SD card is used for the storage section 34, and the storage section 34 stores an abnormality detection program 3P and information for performing an abnormality detection (an abnormality feature amount). In addition, the storage section 34 stores information to be referred during a process by the control circuit 33 and a result of the process.

The position determining section 35 is a module which determines its own position. For example, the position determining section 35 is a GPS (Global Positioning System) receiving section, and preferably measures a position by the centimeter with high precision. Moreover, the position determining section 35 is a receiver of an electric wave in a predetermined frequency band, and may determine its own position (a distance from a fixed station) based on electric wave intensities of electric waves sent from a plurality of fixed stations (beacons) arranged within a building such as a factory or on whether or not an electric wave is received. The position determining section 35 may use a reception intensity of an electric wave in the wireless communication standard such as a Wi-Fi, a Bluetooth (registered trademark). Alternatively, the position determining section 35 is a reader of an RFID (Radio Frequency ID), is located along the production line L1, and may read identification information from a plurality of RFIDs holding different identification information respectively to determine a position.

The control circuit 33 is provided with a power supply section and a microcomputer as with the control circuit 13 in Embodiment 1 and is connected with the storage section 34 as an external storage device. The microcomputer of the control circuit 33 functions as a detection section which performs a control process based on the abnormality detection program 3P stored in the storage section 34 to detect an abnormality. The microcomputer of the control circuit 33 is connected via signal lines with the acceleration sensor 31, the wireless communication section 32 and the position determining section 35. The microcomputer receives an output from the acceleration sensor 31, samples a signal level of the output at a predetermined cycle, obtains a position of the sensor unit 3 existing at the latest or predetermined timing from the position determining section 35 and also gives the wireless communication section 32 information to be transmitted to transmit the information towards the communication apparatus 4. Note that a process of an abnormality detection by the control circuit 33 may be realized by a specific integrated circuit which receives a process from each sensor and performs a control process including an abnormality detection, in addition to being performed based on the abnormality detection program 3P by software.

In Embodiment 2, the communication apparatus 4 may be provided as an apparatus different from the center console which controls the operation of the conveying device. For example, the communication apparatus 4 may be a PC (Personal Computer) used in the center console, or a tablet terminal which is capable of being carried by an operator, or the like. The communication apparatus 4 is provided with a control section 40, a storage section 41, a communication section 42, a display section 43 and an operation section 44.

The control section 40 is provided with a CPU, a built-in ROM and a RAM to control each composition part. A non-volatile memory such as a hard disk or a flash memory is used for the storage section 41. The storage section 41 stores a server-side program 4P corresponding to the abnormality detection program 3P of the sensor unit 3. Moreover, the storage section 41 prestores data for determining a positional relation of data showing a position determined by the sensor unit 3 and of the conveying device of the production line L1. For example, the data is data showing a positional relation of GPS coordinates of the production line, coordinates of each fixed station or identification information assigned to the RFID and of the conveying device. Based on the server-side program 4P, the control section 40 fulfills a function of receiving information transmitted from the sensor unit 3 and displaying (outputting) an abnormality detection to the display section 43, as described below.

For the communication section 42, a wireless communication module of a wireless communication standard corresponding to the wireless communication section 32 of the sensor unit 3 is used. The communication section 42 receives a signal transmitted from the sensor unit 3 over the wireless or via the wireless receiver provided separately (see FIG. 3).

A liquid crystal panel is used for the display section 43 for example and the display section 43 displays information based on the control by the control section 40. For the operation section 44, a mouse or a keyboard, or a touch panel incorporated in the display section 43 is used.

Figure 8:
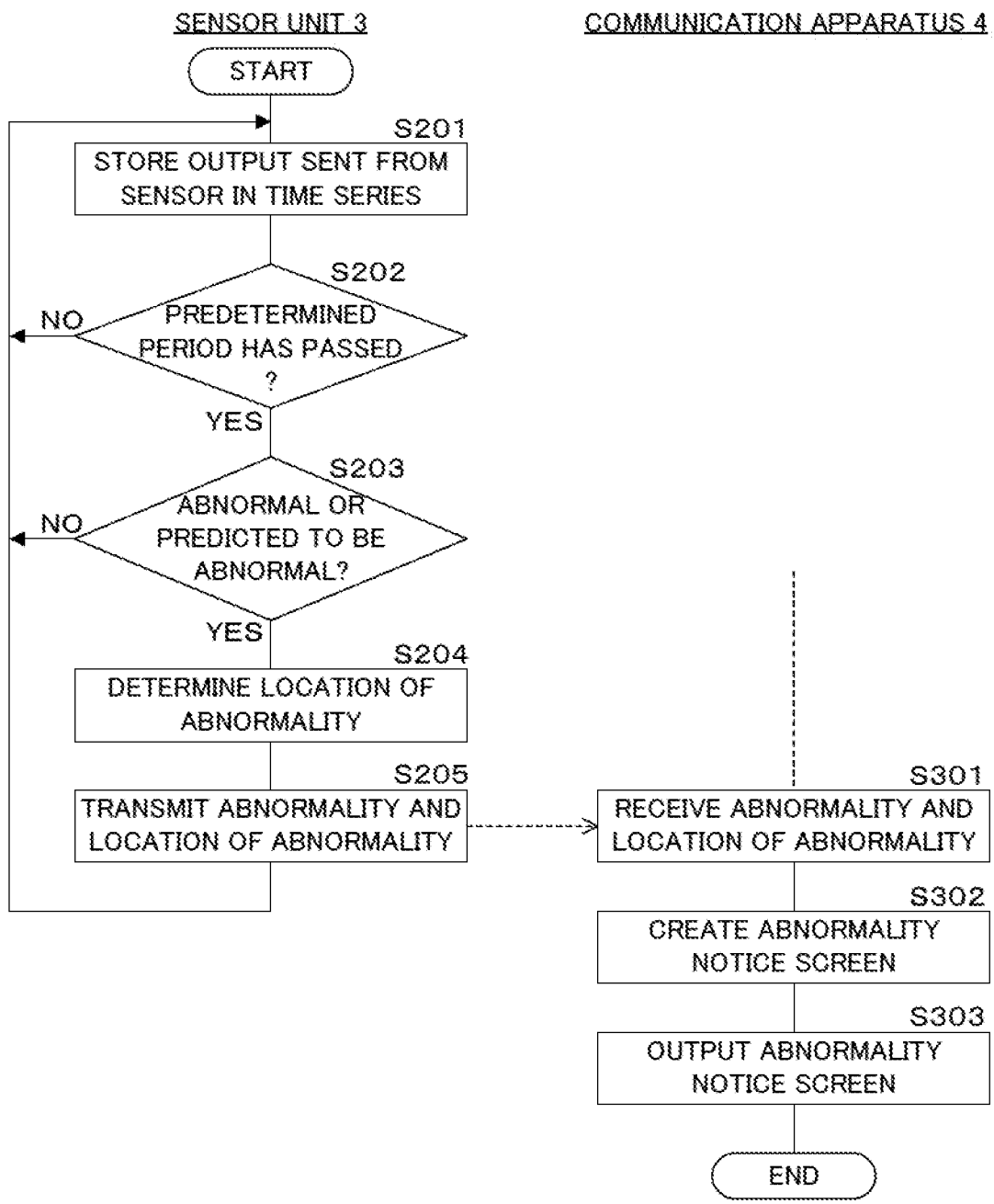
FIG. 8 is a flowchart showing one example of a process procedure of an abnormality detection and an output in Embodiment 2.

FIG. 8 is a flowchart showing one example of a process procedure of the abnormality detection and output in Embodiment 2. In the sensor unit 3, the microcomputer of the control circuit 33 stores an output sent from the acceleration sensor 31 in a built-in memory for each sampling cycle in time series (Step S201). Note that the storage in the built-in memory is preferably performed in the overwrite mode cyclically. The microcomputer judges whether or not a predetermined period has passed (Step S202), and when the microcomputer judges that the predetermined period does not pass (S202: NO), the microcomputer returns the process to Step S201 and continues the sampling and the storage. When the microcomputer judges that the predetermined period has passed (S202: YES), the microcomputer refers to a feature amount for detecting an abnormality which is stored in the storage section 34 relative to the time-series output of each axis of the acceleration sensor 11 which is stored in the built-in memory, and judges whether or not the output is abnormal or is an output predicted to be abnormal (Step S203).

When the microcomputer judges that the output is abnormal or is an output predicted to be abnormal (S203: YES), the microcomputer detects an abnormality thereby and determines a location of the abnormality from the latest position or a position of the sensor unit 3 existing at the timing corresponding to the output judged to be an abnormality, which is sent from the position determining section 35 (Step S204). The microcomputer transmits from the wireless communication section 32 towards the communication apparatus 4 a notice of the abnormality and data showing the location of the abnormality determined at Step S204 (Step S205) and returns the process to Step S201. Note that at Step S205, the microcomputer preferably transmits the notice and the data in association with information for identifying the sensor unit 3. This is to identify respective sensor units 3 in a case where a plurality of the sensor units 3 are provided.

When the microcomputer judges at Step S203 that the output is not abnormal or is not an output predicted to be abnormal (S203: NO), the microcomputer returns the process to Step S201. The microcomputer may delete the output stored in the built-in memory at this time.

In the communication apparatus 4, the communication section 42 receives the notice of the abnormality and the location of the abnormality transmitted from the sensor unit 3 (Step S301). In a case where the notice of the abnormality and the location of the abnormality are transmitted in association with the identification information of the sensor unit 3, the communication section 42 also receives the identification information. The control section 40 creates an abnormality notice screen from the received data of the notice of the abnormality and the location of the abnormality based on the server-side program 4P (Step S302), outputs the abnormality notice screen to the display section 43 (Step S303), and ends the process. Note that in the communication apparatus 4 the notified contents of abnormality and location of abnormality may be outputted to the storage section 41 as a log.

Note that a method of detecting an abnormality at Step S203 is the same as that in Embodiment 1. That is, the microcomputer can detect an abnormality by a pattern of the outputs sent from the acceleration sensor 11 or a frequency analysis based on the abnormality detection program 3P.

Figure 9A:
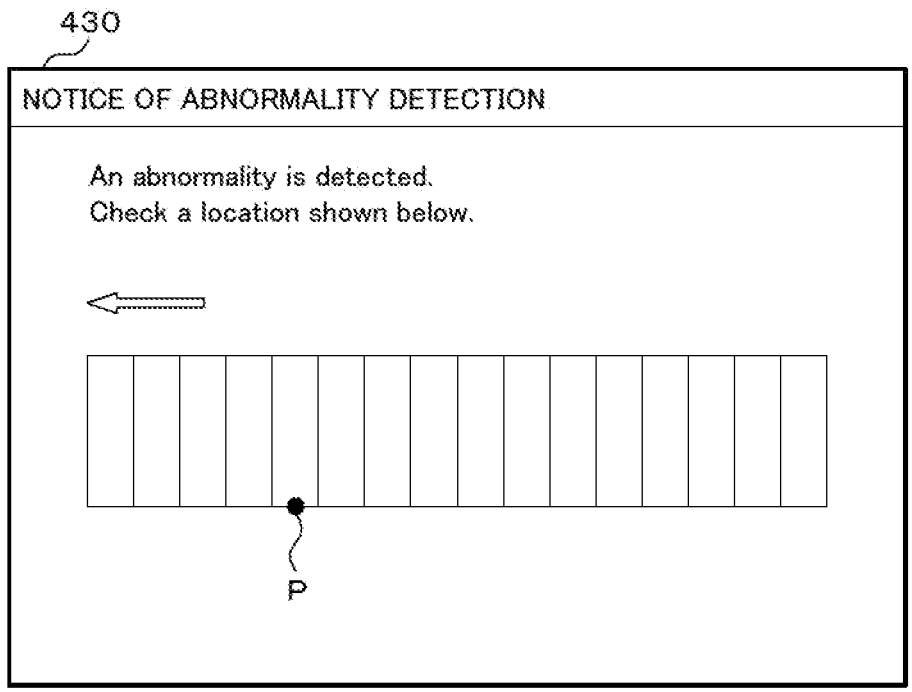
FIG. 9A is an example of a screen of an abnormality detection displayed on a display section.
Figure 9B:
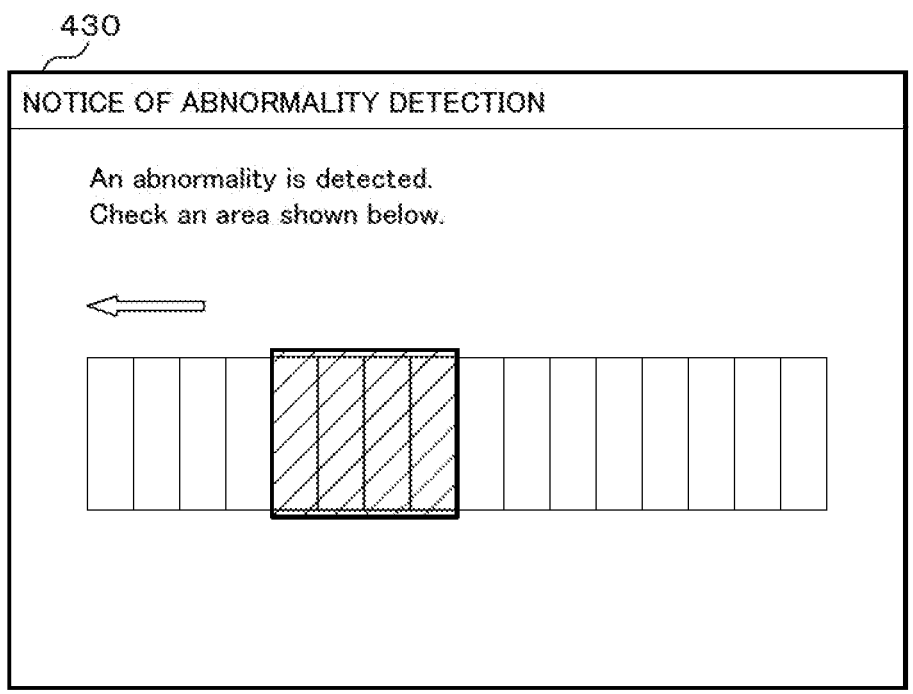
FIG. 9B is an example of a screen of an abnormality detection displayed on the display section.

FIGS. 9A and 9B show examples of a screen of an abnormality detection displayed on the display section 43. FIG. 9A shows a display example of a case where the position determining section 35 determines a position based on an electric wave sent from the GPS receiving section or the fixed station, and FIG. 9B shows a display example of a case where the position determining section 35 is an RFID reader. In FIG. 9A, a location of an abnormality on a layout of the conveying device is shown with a point P on an abnormality notice screen 430 displayed on the display section 43. In FIG. 9B, a location of an abnormality on the layout of the conveying device is shown with hatching on the similar abnormality notice screen 430. When a hatching portion is outputted to the display section 43 with a predetermined color, blinking or the like, the hating portion is easily recognized by an operator.

Thus, the process of detecting an abnormality and the process of determining a location of the abnormality may be performed on a side of the sensor unit 3. In this case, one sensor unit 3 is attached to the conveyor chain C1 or a plurality of sensor units 3 are attached to the conveyor chain C1 in an identifiable manner, and the above-described server-side program 4P is stored in a general-purpose computer, which can apply the abnormality detection system to the existing system. Moreover, also in Embodiment 2, the sensor unit 3 may not be provided with the wireless communication section 32 and may store in the storage section 34 a detected abnormality and a location thereof so as to check the abnormality later.

Embodiment 3

Figure 10:
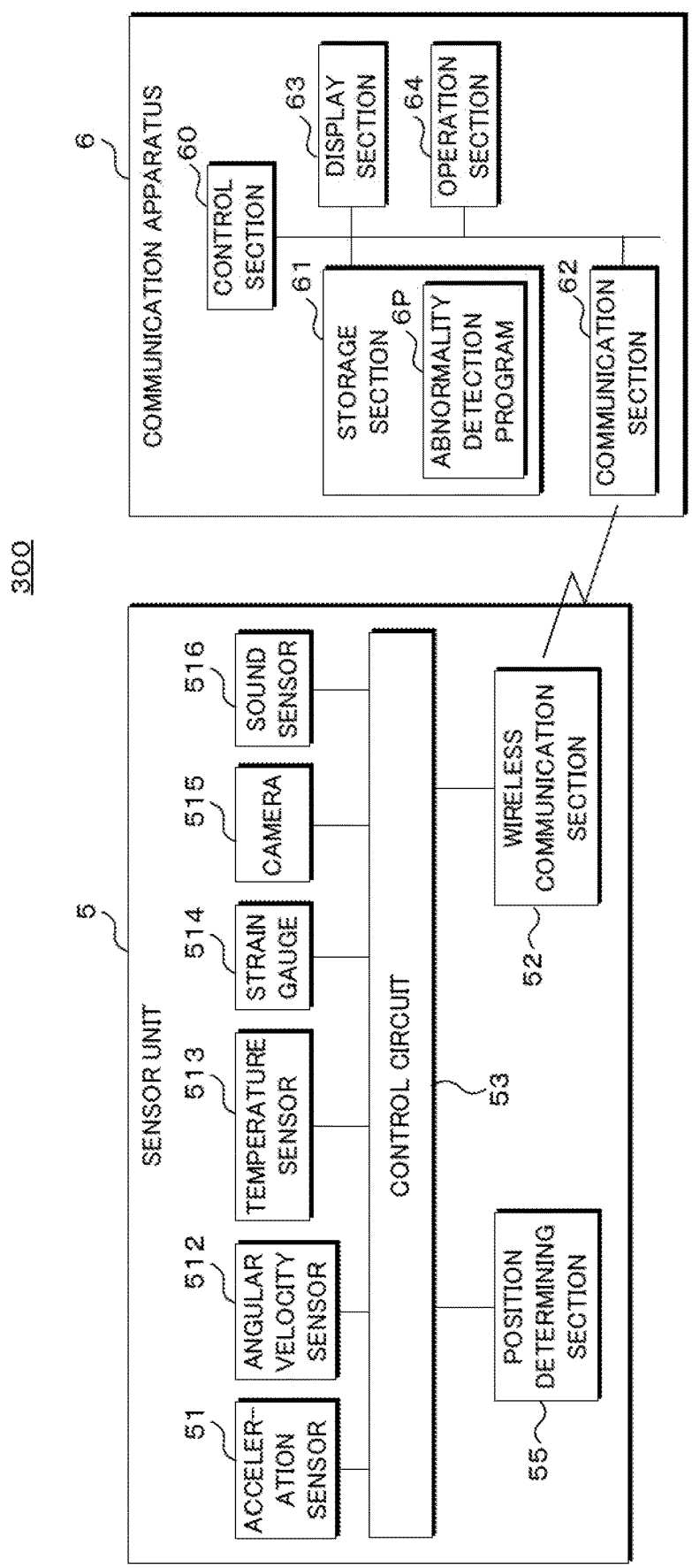
FIG. 10 is a block diagram showing a configuration of an abnormality detection system in Embodiment 3.

FIG. 10 is a block diagram showing a configuration of an abnormality detection system 300 in Embodiment 3. In Embodiment 3, the abnormality detection system 300 comprises a sensor unit 5 attached to a link plate of a link of the conveyor chain C1, and a communication apparatus 6. In the abnormality detection system 300, the sensor unit 5 attached to the conveyor chain C1 transmits outputs sent from a group of sensors and the communication apparatus 6 receives the outputs and detects an abnormality.

The sensor unit 5 is provided with an acceleration sensor 51, a wireless communication section 53, a control circuit 53, a position determining section 55, an angular velocity sensor 512, a temperature sensor 513, a strain gauge 514, a camera 51 and a sound sensor 516 in a case 50.

The following omits a detailed explanation because the acceleration sensor 51 and the wireless communication section 52 are the same as the acceleration sensor 11 and the wireless communication section 12 provided in the sensor unit 1 in Embodiment 1, respectively.

The position determining section 55 is the same as the position determining section 35 in Embodiment 2, and determines its own position by any of various techniques.

The angular velocity sensor 512 is fixed in the case 50 of a rectangular parallelepiped shape and outputs a signal corresponding to a tilt.

The temperature sensor 513 is provided on a plane of the rectangular-parallelepiped-shaped case 50 which is attached to the link plate, and preferably measures a temperature close to a surface temperature of the conveyor chain C1 (a surface temperature of the link). Note that two temperature sensors 513 may be used and located on a close plane close to the link plate and on place opposite to the close plane respectively and be configured to measure a temperature difference between the surface temperature of the link and an environmental temperature.

A piezoelectric element etc. is used for the strain gauge 514, and the strain gauge 514 measures tension applied to the link.

A CCD (Charge Coupled Device) camera is used for the camera 515 for example, and the camera 515 is located towards the outside of the case 50 and outputs an imaged video signal. The camera 515 may be located on any of five planes other than the close plane close to the link plate among six planes of the case 50, and may be located towards a travel direction of the conveyor chain C1 or backward, or may be located on the plane opposite to the close plane outward, for example.

The sound sensor 516 is provided with a sound collector and a process circuit which performs a filter process of removing a predetermined frequency band, a process of adjusting a sound and the like, for example. The sound sensor 516 may output a sound volume for each of a plurality of frequency bands as data.

The control circuit 53 is provided with a power supply section and a microcomputer. The power supply section uses a battery as a power source to supply electric power to not only the microcomputer but also each composition part of the sensor unit 5. The microcomputer of the control circuit 53 is connected via a signal line with each sensor including the acceleration sensor 51, the wireless communication section 52 and the position determining section 55. The microcomputer receives an output from each sensor, samples a signal level of the output at a predetermined cycle and regularly transmits the read signal level as data from the wireless communication section 52 towards the communication apparatus 6. Moreover, the microcomputer obtains a position at a predetermined cycle from the position determining section 55 and transmits the position from the wireless communication section 52 towards the communication apparatus 6. At this time, the microcomputer preferably transmits a video signal outputted from the camera 515 towards the communication apparatus 6 at the similar timing. Note that the microcomputer may obtain time information from a built-in timer and transmit the time information with information on a determined position or a video signal obtained from the camera 515.

In Embodiment 3, the communication apparatus 6 is provided as an apparatus different from the center console which controls the operation of the conveying device. For example, the communication apparatus 6 may be a PC used in the center console, or a tablet terminal which is capable of being carried by an operator, or the like. The communication apparatus 6 is provided with a control section 60, a storage section 61, a communication section 62, a display section 63 and an operation section 64.

The control section 60 is provided with a CPU, a built-in ROM and a RAM to control each composition part. A non-volatile memory such as a hard disk or a flash memory is used for the storage section 61. The storage section 61 stores an abnormality detection program 6P. The storage section 61 also stores information for performing an abnormality detection (an abnormality feature amount). Moreover, the storage section 61 prestores data for determination a positional relation of data showing a position determined by the sensor unit 5 and of the conveying device of the production line L1. For example, the data is data showing a positional relation of GPS coordinates of the production line, coordinates of each fixed station or identification information assigned to the RFID and of the conveying device. Based on the abnormality detection program 6P, the control section 60 functions as a detection section which receives an output of each sensor transmitted from the sensor unit 5, analyzes the output and detects an abnormality, and also fulfills a function of displaying (outputting) an abnormality detection to the display section 63, as described below.

For the communication section 62, a wireless communication module of a wireless communication standard corresponding to the wireless communication section 52 of the sensor unit 5 is used, or the communication section 62 receives a signal from an external wireless receiver. The communication section 62 receives a signal transmitted from the sensor unit 5 over the wireless or via the wireless receiver.

A liquid crystal panel is used for the display section 63 for example and the display section 63 displays information based on the control by the control section 60. For the operation section 64, a mouse or a keyboard, or a touch panel incorporated in the display section 63 is used.

Figure 11:
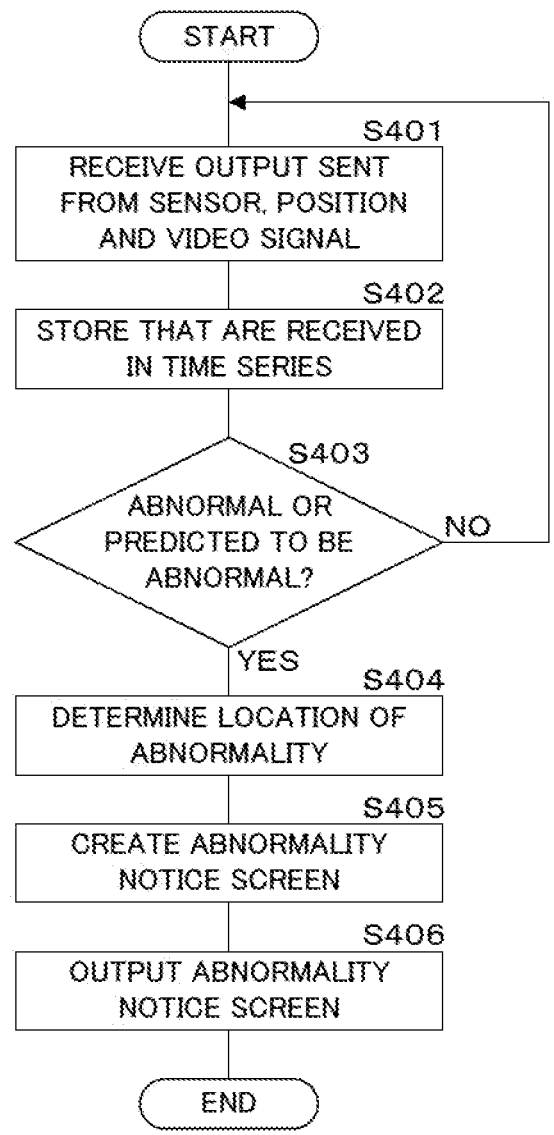
FIG. 11 is a flowchart showing one example of a process procedure of an abnormality detection in a communication apparatus.

FIG. 11 is a flowchart showing one example of a process procedure of an abnormality detection in the communication apparatus 6. The sensor unit 5 regularly transmits from the wireless communication section 52 an output sent from each sensor, a position of the sensor unit 5 and a video signal sent from the camera 515, as described above. On the other hand, the control section 60 of the communication apparatus 6 repeatedly performs the processing procedure as shown below.

The control section 60 receives the output sent from each sensor, the position of the sensor unit 5 and the video signal sent from the camera 515 which are regularly transmitted from the sensor unit 5 (Step S401). In a case where the output, the position and the video signal are transmitted in association with the identification information of the sensor unit 5, the communication section 62 also receives the identification information. The control section 60 stores the output sent from each sensor in a built-in memory in time series (Step S402). Note that the storage in the memory is preferably performed in the overwrite mode cyclically. The control section 60 refers to a feature amount for detecting an abnormality which is stored in the storage section 61 relative to the output of each sensor and the video signal in a predetermined period which is stored at Step S402, and judges whether or not the output or the video signal is abnormal or is an output or an video signal predicted to be abnormal (Step S403). Note that the judgment at Step S403 may be performed using as a trigger a case where there is a predetermined change in the output of each sensor.

When the control section 60 judges that the output or the video signal is abnormal or is an output or a video signal predicted to be abnormal (S403: YES), the control section 60 detects an abnormality thereby to determine a location of the abnormality (Step S404). In a case where the detected abnormality is not an abnormality of the whole such as a stretch of the whole conveyor chain C1, the control section 60 can determine at Step S404 a location of the abnormality from a position of the sensor unit 5 to which corresponds the time information in association with the output or the video signal judged to be an abnormality. Regarding a position of the sensor unit 5, the control section 60 extracts a corresponding position from position data regularly obtained from the sensor unit 5 for example. The control section 60 may extract a corresponding position from the output or video signal and the position data whose transmission timing approximately coincide with each other. In a case where the output sent from each sensor, the video signal and the position data are transmitted in association with the time information, the control section 60 may extract position data of a time coinciding with the output judged to be an abnormality, based on the time information.

The control section 60 creates an abnormality notice screen showing the location of the abnormality determined at Step S404 (Step S405), outputs the abnormality notice screen to the display section 63 (Step S406), and ends the process. It is desirable that the abnormality notice screen created at Step S405 distinctively shows the contents of a detected abnormality such as a pitch stretch, a displacement of an alignment, for example. Note that the control section 60 may perform a process of separately storing in the storage section 61 video signals obtained for a predetermined period including both of before and after a timing at which an abnormality is detected or any one of the both with information for identifying the detected abnormality before or after Step S405 or Step S406. Thereby, there is a possibility that a factor of an abnormality can be easily recognized from the video signal.

When the control section 60 judges that the output or the video signal is not abnormal or is not an output or a video signal predicted to be abnormal (S403: NO), the control section 60 returns the process to Step S401 and continues the reception of a output sent from each sensor, a video signal sent from the camera and a position data of the sensor unit 5, the storage thereof and the detection of an abnormality.

The following explains the abnormality detection at Step S403 in Embodiment 3. The output sent from the acceleration sensor 51 is the same as those in Embodiments 1 and 2. The output sent from the angular velocity sensor 512 is the same as the output sent from the acceleration sensor 51, and the control section 60 can judge whether or not the conveyor chain C1 is moving lumberingly such as surging from a periodicity of the output. The control section 60 may perform a frequency analysis on the output sent from the acceleration sensor 51 and the output sent from the angular velocity sensor 512, compare a count of a specific frequency with the feature amount stored in the storage section 61, and judge whether or not the count is unusually high or low or whether or not the frequencies of the greatest counts are identical with each other, or the like.

Regarding the temperature sensor 513, the control section 60 can compare a threshold of a normal range of a temperature stored in the storage section 61 with a temperature obtained from the temperature sensor 513, and judge that there is an abnormality or an abnormality is predicted when the temperature obtained from the temperature sensor 513 is out of the normal range. For example, in a state where the oil supply to the conveyor chain C1 is insufficient, the surface temperature of the conveyor chain C1 may rise excessively. Note that in a case where a plurality of temperature sensors 513 are provided in the sensor unit 5 or a case where the communication apparatus 6 can obtain an air temperature in a factory, the control section 60 can judge that there is an abnormality or an abnormality is predicted when a temperature difference between an environment temperature in the factory and a temperature measured by the temperature sensor 513 is equal to or higher than a predetermined value.

Regarding the strain gauge 514, the control section 60 can judge that there is an abnormality or an abnormality is predicted when tension applied to a link measured by the strain gauge 514 is equal to or higher than a predetermined value stored in the storage section 61. For example, in a case where the conveyor chain C1 is moving lumberingly such as surging, each link pulls at each other and then is under tension higher than tension occurring when the conveyor chain C1 is fed normally. It is possible to detect such a state with the output sent from the strain gauge 514. Note that the control section 60 refers to the output sent from the acceleration sensor 51 and the output sent from the angular velocity sensor 512, and comprehensively judges whether or not the conveyor chain C1 is moving lumberingly also by means of the output sent from the strain gauge 514 to detect an abnormality, which can detect an abnormality with higher precision.

Regarding the camera 515, the control section 60 can analyze a video (image) based on a video signal obtained from the camera 515, compare the video with a video (image) in a normal condition which is prestored in the storage section 61 as a feature amount, and judge whether or not a foreign matter is mixed in the circumference of the conveyor chain C1. Note that a video signal sent from the camera 515 may be used for record in a case where an abnormality is detected as described above.

Regarding the sound sensor 516, the control section 60 may perform a frequency analysis of a sound collected by the sound sensor 516, compare the result with a frequency distribution of a sound in a normal condition which is stored in the storage section 61 as a feature amount, and judge whether or not an abnormal noise occurs. Moreover, the control section 60 can determine whether or not a sound of a specific frequency occurs periodically by an analysis, and detect as an abnormality a displacement of an alignment of teeth of the sprocket wheels C2, a bite and the like.

Thus, the sensor unit 5 including various sensors is attached to the conveyor chain C1 which continues moving in the equipment, which can detect a location (factor) of an abnormality while distinguishing the same and hold a video signal obtained by imaging an intricate site such as a site which cannot be checked by an operator etc.

Note that the control section 60 may detect an abnormality based on whether or not outputs sent from the acceleration sensor 51, the angular velocity sensor 512, the temperature sensor 513 and the strain gauge 514 are contradictory to a situation presumed from the feature amount stored in the storage section 61. Moreover, the angular velocity sensor 512, the temperature sensor 513, the strain gauge 514, the camera 515 and the sound sensor 516 shown in Embodiment 3 may be selected according to an object of the abnormality detection.

Embodiment 4

Figure 12:
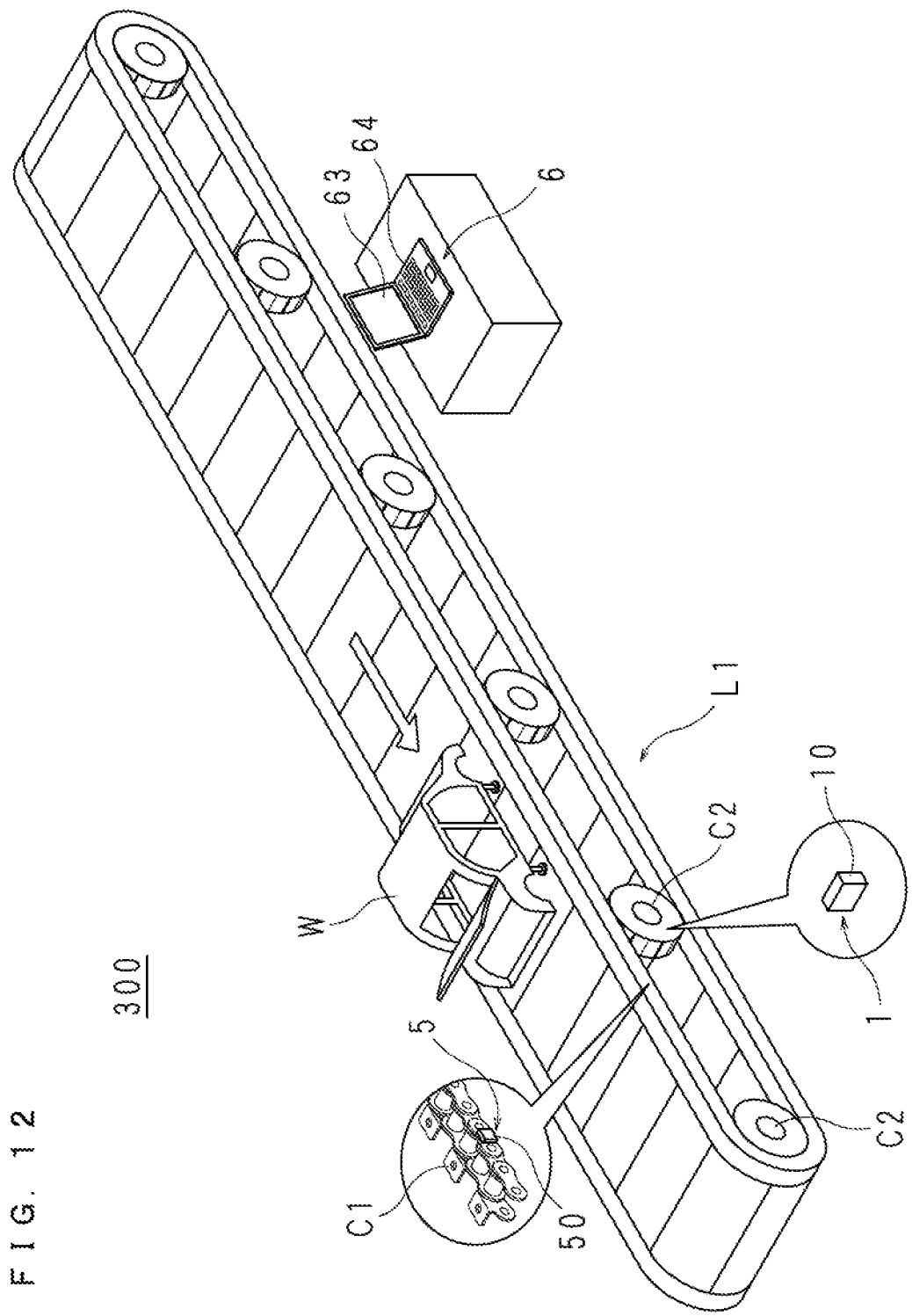
FIG. 12 is an explanatory drawing explaining an outline of an abnormality detection system in Embodiment 4.
Figure 13:
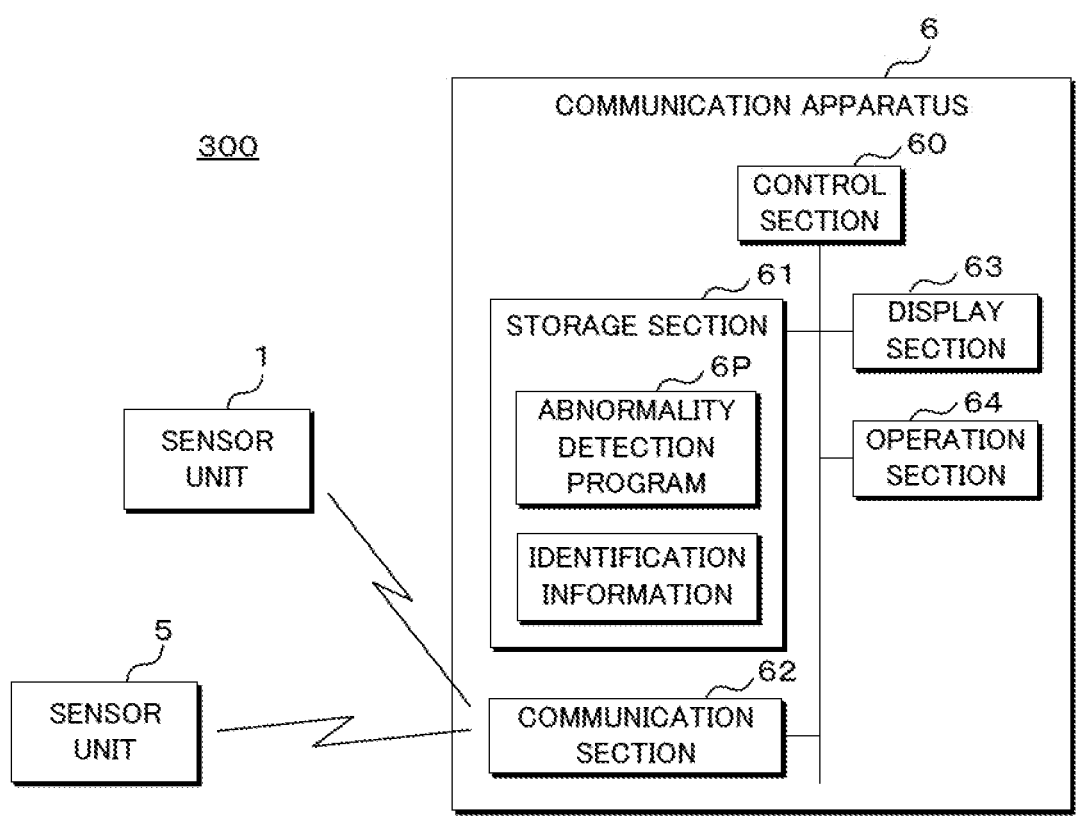
FIG. 13 is a block diagram showing a configuration of the abnormality detection system in Embodiment 4.

FIG. 12 is an explanatory drawing explaining an outline of an abnormality detection system 300 in Embodiment 4, and FIG. 13 is a block diagram showing a configuration of the abnormality detection system 300 in Embodiment 4. The configuration of the abnormality detection system 300 in Embodiment 4 is the same as that in Embodiment 3, except that a plurality of sensor units are used and thereby the details of the abnormality detection process by the control section 60 of the communication apparatus 6 are different. The same reference code is assigned to the common component part and a detailed explanation thereof is omitted.

In Embodiment 4, as shown in FIG. 12, the sensor unit 5 also including other sensors in addition to the acceleration sensor 51 is attached to the conveyor chain C1. Also, the sensor unit 1 including the acceleration sensor 11, the wireless communication section 12 and the control circuit 13 only which are shown in Embodiment 1 is attached to the sprocket wheel C2. The sensor unit 1 is attached to a position at which the sprocket wheel C2 is not rotated such that one axis of three axes of the acceleration sensor 11 extends in the up-and-down direction (approximately vertical direction). This is why the acceleration sensor 11 measures a vibration of the sprocket wheel C2 in the up-and-down direction. Note that the sensor unit 1 may be attached to the specific sprocket wheel C2 only, as shown in FIG. 12 but the sensor unit 1 may be attached to a plurality of the sprocket wheels C2 or all of the sprocket wheels C2.

In Embodiment 4, the communication apparatus 6 receives an output of each sensor, a position and a video signal from the sensor unit 1 and the sensor unit 5, compares both of the outputs, and detects an abnormality while distinguishing a location of the abnormality. The sensor unit 1 and the sensor unit 5 transmit the output of the sensor along with time information from the wireless communication section 112 and the wireless communication section 52 towards the communication apparatus 6, respectively. At this time, the control circuit 13 of the sensor unit 1 and the control circuit 53 of the sensor unit 5 transmit identification information for identifying itself, together respectively. In the communication apparatus 6, the storage section 61 prestores the identification information of the sensor unit 1 and the identification information of the sensor unit 5 so that it can be identified whether a transmission source of received information is the sensor unit 1 or the sensor unit 5. Moreover, in Embodiment 4 the sensor unit 1 does not transmit its own position, and therefore in the communication apparatus 6 the storage section 61 stores information for determining a position of the sprocket wheel C2 to which the sensor unit 1 is attached.

Figure 14:
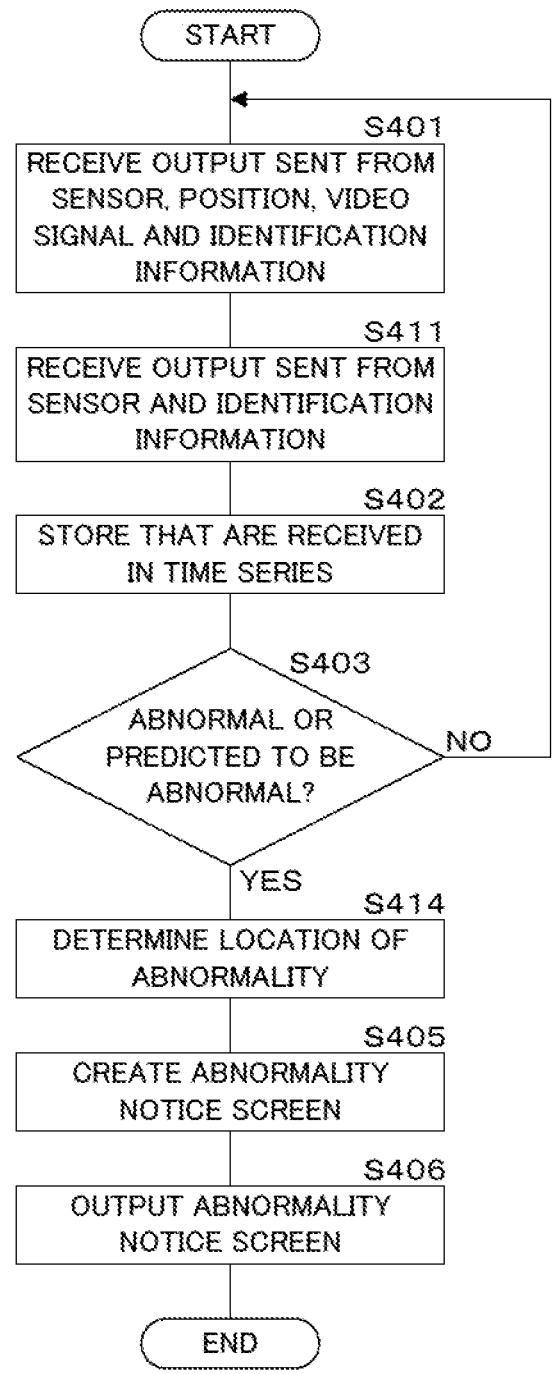
FIG. 14 is a flowchart showing one example of a process procedure of an abnormality detection in Embodiment 4.

FIG. 14 is a flowchart showing one example of a process procedure of an abnormality detection in Embodiment 4. The same step numbers are assigned to steps common to the steps shown in the flow chart of FIG. 11 of Embodiment 3 among steps shown in the flow chart of FIG. 14, and a detailed explanation thereof is omitted.

The control section 60 receives an output sent from the sensor unit 5, a position and a video signal along with the identification information of the sensor unit 5 (S401), and receives an output sent from the sensor unit 1 along with the identification information of the sensor unit 1 (Step S411). The control section 60 stores the output, position and video signal which are received from the sensor unit 5 and the output which is received from the sensor unit 1 in a built-in memory in time series (Step S402).

The control section 60 judges whether or not the output or the video signal is abnormal or is an output or a video signal predicted to be abnormal about the output and video signal which are stored at Step S402 and are received from the sensor unit 1 and the sensor unit 5 (S403).

When the control section 60 judges that the output or the video signal is abnormal or is an output or a video signal predicted to be abnormal (S403: YES), the control part 60 detects an abnormality thereby to determine a location of the abnormality (Step S414). Detecting an abnormality at Step S403 and determining a location of the abnormality at Step S414 are described below with reference to FIG. 15.

The control section 60 creates an abnormality notice screen showing the location of the abnormality determined at Step S414 and the contents of the abnormality detected at Step S403 (Step S405), outputs the abnormality notice screen to the display section 63 (Step S406), and ends the process. Also, in this case, the video signal imaged by the sensor unit 5 attached to the conveyor chain C1 may be recorded.

Figure 15:
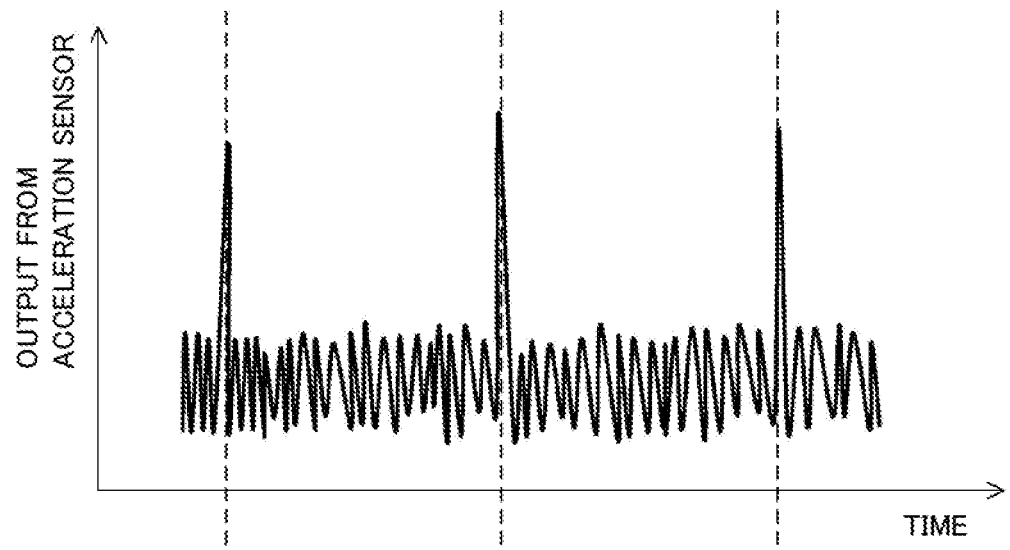
FIG. 15 is an explanatory drawing explaining an example of contents of a sensor output judged to be the abnormality detection.
Figure 15:
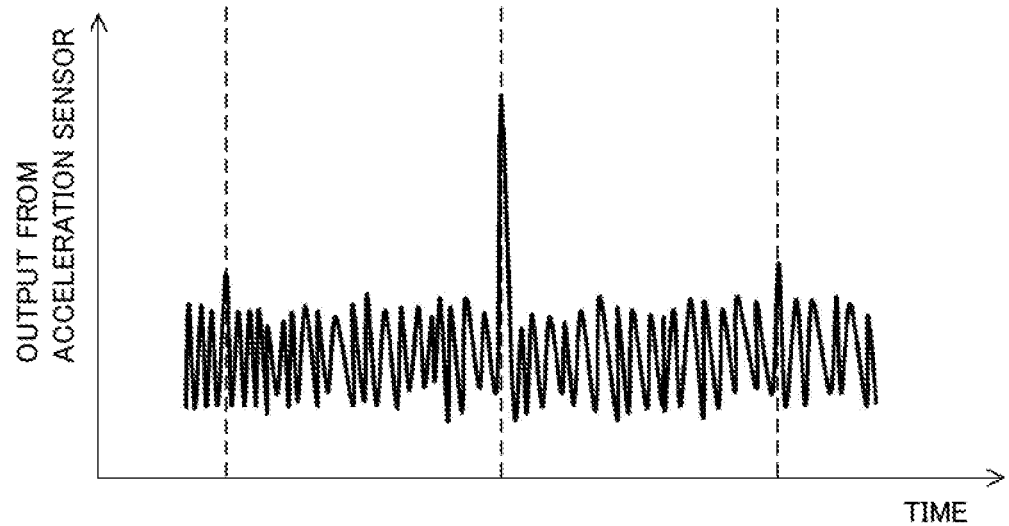

The following shows and explains one example about the abnormality detection in Embodiment 4. In Embodiment 4, the acceleration sensor 11 of the sensor unit 1 attached to the sprocket wheel C2 is used along with the sensor unit 5 attached to the conveyor chain C1. For this reason, it is possible to distinctively detect an abnormality in the conveyor chain C1 and an abnormality in the sprocket wheel C2, i.e., locations of the abnormalities. FIG. 15 is an explanatory drawing explaining an example of contents of a sensor output judged to be the abnormality detection. FIG. 15A is a graph obtained by plotting and connecting sensor outputs in the axis extending in the up-and-down direction of the acceleration sensor 51 of the sensor unit 5 relative to time course, and FIG. 15B is a graph obtained by plotting and connecting sensor outputs of the acceleration sensor 11 of the sensor unit 1. Note that a waveform of FIG. 15A and a waveform of FIG. 15B are waveforms obtained in the same phenomenon, and the time course of a horizontal axis corresponds thereto.

In the waveform of FIG. 15A, a vibration at a short cycle overlaps with a vibration at a longer cycle. When the conveying device is operating normally, the link vibrates in the up-and-down direction at a constant cycle at the timing at which the link is fed between the sprocket wheels C2 as described in Embodiment 1, and a cycle (pulse interval) thereof is constant. In the waveform of FIG. 15A, a large vibration occurs at a longer cycle. When this cycle corresponds to a distance between the plurality of sprocket wheels C2, there is a possibility that an abnormality such as a bite occurs between the link of the conveyor chain C1 and the sprocket wheel C2. Furthermore, it is presumed that a large vibration occurs each time the link engages with the sprocket wheel C2 and thereby a foreign matter exists not between the link and the specific sprocket wheel C2 but on a side of the conveyor chain C1 and the link causes a vibration against each of the sprocket wheels C2. At first, the control section 60 can detect an abnormality in this way. However, in the waveform of FIG. 15A only, the vibration is constant in the whole conveyor chain C1, and therefore it is difficult to determine a location where the foreign matter exists.

To the contrary, in the output sent from the acceleration sensor 11 of the sensor unit 1 attached to the sprocket wheel C2 shown in FIG. 15B, a vibration at a short constant cycle due to the engagement with the conveyor chain C1 appears together with a large vibration which occurs event-wise. In this case, it is possible to detect that an abnormality occurs based on the output sent from the acceleration sensor 11 of the sensor unit 1. However, from the waveform of FIG. 15B, the control section 60 can merely recognize that an abnormality does not occur in the sprocket wheel C2 to which the sensor unit 1 is attached because a large vibration does not always occur. It is difficult to distinguish whether an abnormality occurs on a side of the conveyor chain C1 or an abnormality occurs in the other sprocket wheel C2. That is, it is difficult to determine a location of an abnormality from the waveform of FIG. 15B only.

However, the control section 60 judges by means of both of the waveform of FIG. 15A and the waveform of FIG. 15B, and thereby the control section 60 can recognize that a foreign matter existing in the conveyor chain C1 causes a large vibration each time the foreign matter is bitten by each of the sprocket wheels C2. Then, the control section 60 recognizes that a large vibration is observed on the side of the sensor unit 1 when the foreign matter is bitten by the sprocket wheel C2 to which the sensor unit 1 is attached. For this reason, the control section 60 can specify the link which passes the sprocket wheel C2 to which the sensor unit 1 is attached as a location of an abnormality.

The present invention is not limited to this, and in addition, the control section 60 can determine both of a phenomenon of a detected abnormality and a location of the abnormality according to a combination of patterns of waveforms. For example, also in the output sent from the acceleration sensor 51 of the sensor unit 5, there is a high possibility that an abnormality occurs on a side of the sprocket wheel C2 in a case where a vibration occurs event-wise as shown in FIG. 15B. In this case, there is a high possibility that an abnormality occurs in the sprocket wheel C2 located at a position where the sensor unit 5 passes when the vibration occurs. However, in this case the sensor units 1 are attached to the two sprocket wheels C2 located separately in the conveying device respectively, magnitudes of amplitudes of vibrations occurring event-wise as shown in FIG. 15B are compared, it is distinguished whether a large vibration occurs at a position closer to any of the sprocket wheels C2, and thereby there is a high possibility that a position of an abnormality can be determined with precision.

Thus, the sensor unit 1 or the sensor unit 5 is attached not only to the conveyor chain C1 which continues moving in the conveying device, but also to another part which does not move in the conveying device, and outputs sent from these sensor units are analyzed together. For this reason, it is possible to specify a phenomenon measured by each sensor as a phenomenon occurring at any location, with precision.

Embodiment 5

Figure 16:
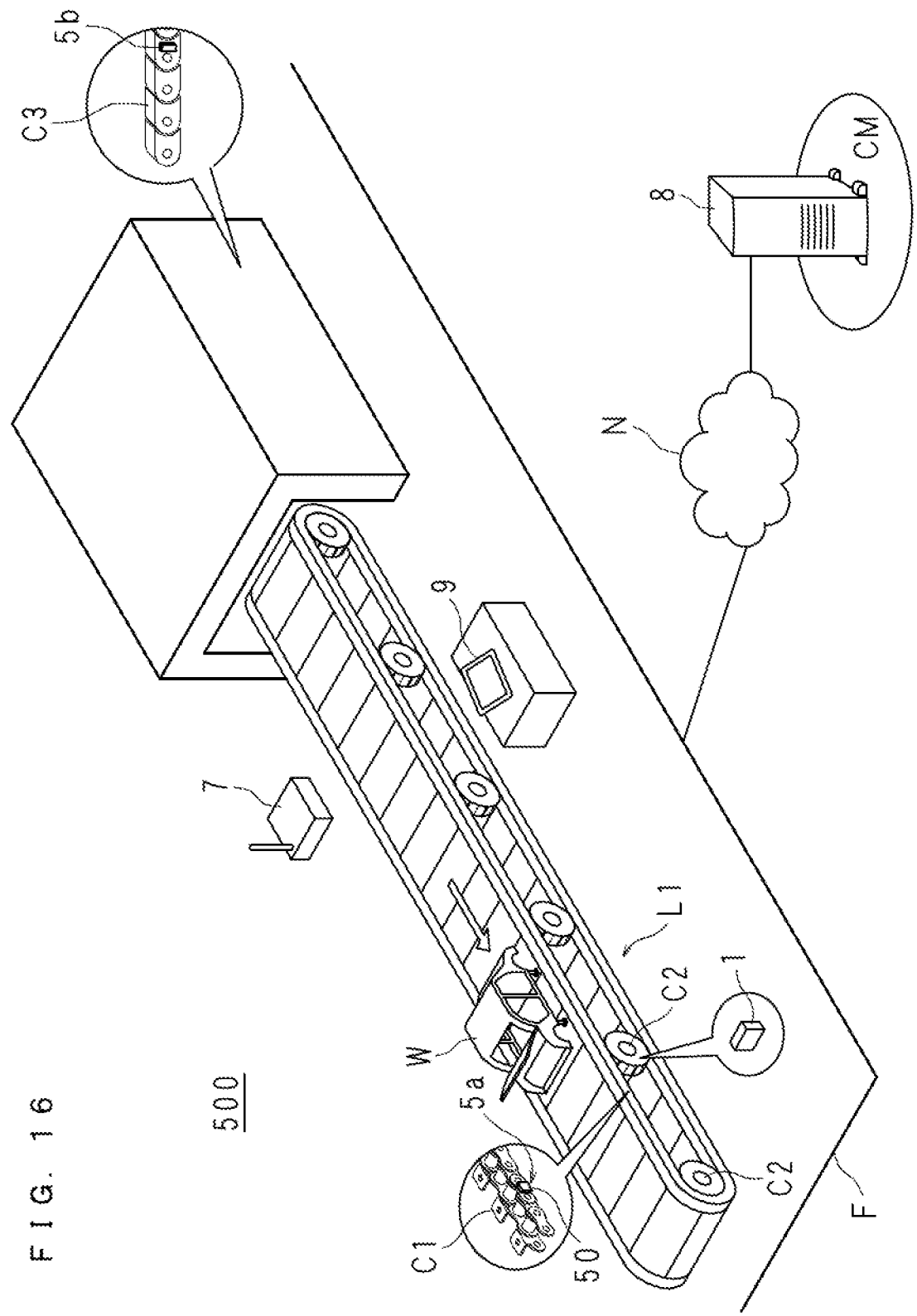
FIG. 16 is an explanatory drawing explaining an outline of an abnormality detection system in Embodiment 5.

FIG. 16 is an explanatory drawing explaining an outline of an abnormality detection system 500 in Embodiment 5. The abnormality detection system 500 in Embodiment 5 targets at a plurality of production lines L1 and a production device M1, . . . of a factory F as an object of an abnormality detection. The production line L1 is a conveying device comprising the conveyor chain C1 and the sprocket wheel C2 which are shown in Embodiment 1. The production device M1 comprises a chain C3 similarly. The abnormality detection system 500 comprises a sensor unit 5a attached to the conveyor chain C1, a sensor unit 1 attached to the sprocket wheel C2, and a sensor unit 5b attached to the chain C3. The abnormality detection system 500 further comprises a communication apparatus 7 which collects information sent from the sensor units 1, 5a, 5b, a server apparatus 8, and a terminal device 9.

The communication apparatus 7 is a so-called IoT (Internet Of Things) server, is connected via a LAN in the factory with a public telecommunication network N, and can communicates with the server apparatus 8. The terminal device 9 is a PC which is used by an operator of the factory F, and can be connected with the LAN in the factory similarly. The server apparatus 8 is a server computer which is operated by a provider CM who provides a maintenance service of the conveyor chain C1 and the chain C3, and can be connected via the public telecommunication network N with a predetermined communication apparatus. In the abnormality detection system 500, the server apparatus 8 receives information sent from the sensor units 1, 5a, 5b via the communication apparatus 7, analyzes the information, detects an abnormality, and outputs the detected abnormality to the terminal device 9. The public telecommunication network N is the so-called Internet, and serves as a communication medium between the communication apparatuses which are appropriately connected via network equipment or an access point AP or the like.

Figure 17:
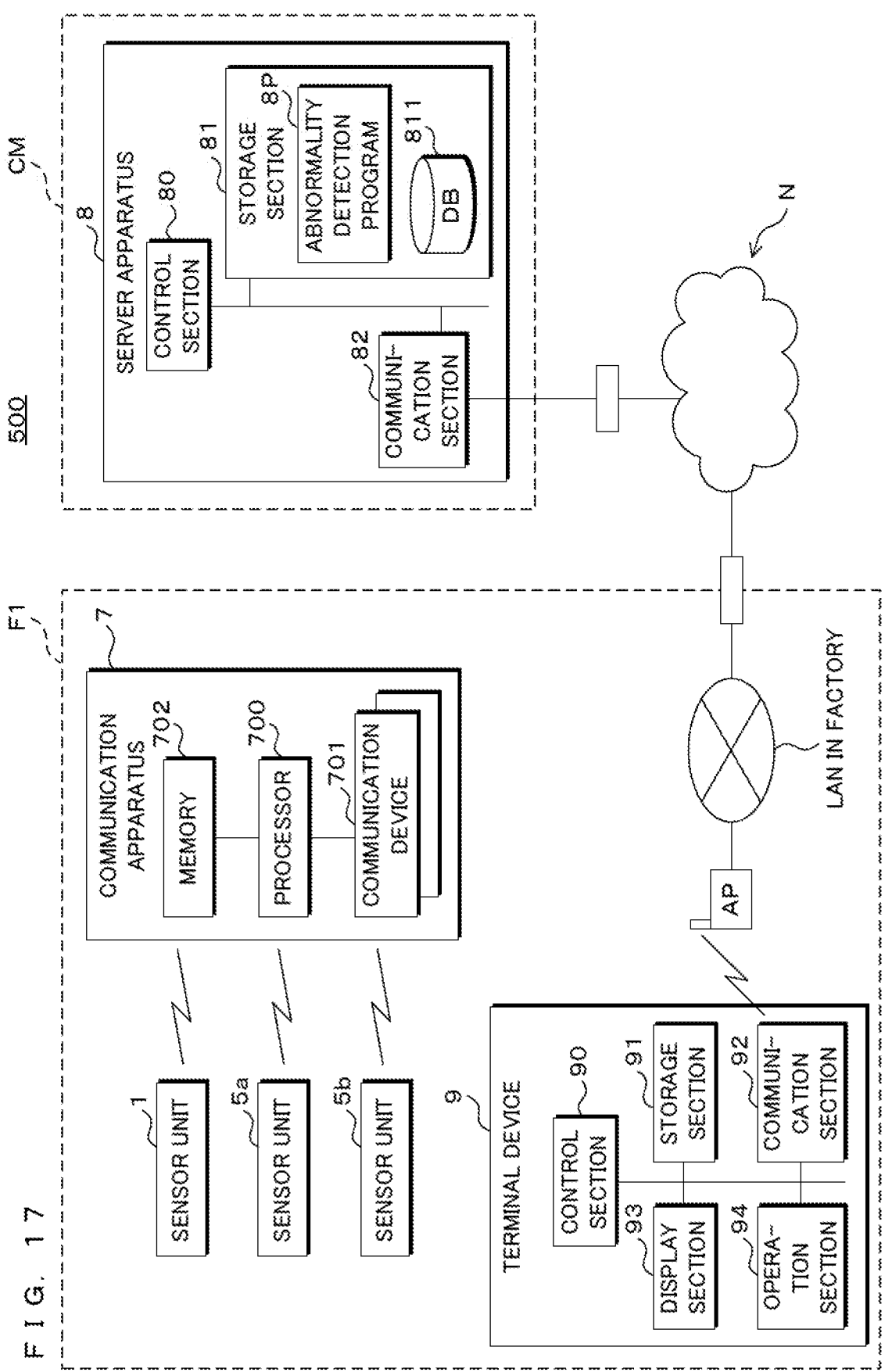
FIG. 17 is a block diagram showing a configuration of the abnormality detection system in Embodiment 5.

FIG. 17 is a block diagram showing a configuration of an abnormality detection system 500 in Embodiment 5. The sensor unit 1 is the same as that shown in Embodiment 1, and therefore the same reference code is assigned thereto and a detailed explanation thereof is omitted. In the sensor units 5a, 5b, the alphabets a and b are merely assigned to the reference codes respectively in order to mutually identify the sensor units 5a, 5b, and the configurations thereof are the same as the configuration of the sensor unit 5 shown in Embodiment 3, and therefore a detailed explanation thereof is omitted. Note that in Embodiment 5, the wireless communication sections 12, 52 of the sensor units 1, 5a, 5b transmit an output of the sensor etc. in association with the identification information of the sensor units 1, 5a, 5b towards the communication apparatus 7 by a Bluetooth (registered trademark), especially a BLE.

An apparatus which is called a so-called IoT gateway is used for the communication apparatus 7, as described above. The communication apparatus 7 is provided with a plurality of communication devices 701. The communication apparatus 7 is further provided with a processor 700 and a memory 702. The processor 700 performs a process of transmitting and receiving outputs etc., which are transmitted from the sensor units 1, 5a, 5b respectively, based on a prestored program by means of a CPU and a clock and the like. The plurality of communication devices 701 may include a device for communication with the sensor units 1, 5a, 5b, a device for an Ethernet (registered trademark) of the LAN in the factory, and a device for a wireless LAN.

A non-volatile memory such as a flash memory is used for the memory 702 of the communication apparatus 7, and the memory 702 stores information to be referred by the processor 700. Moreover, the memory 702 stores an identifier for identifying the communication apparatus 7 itself, and identification information for distinguishing the factory F where the communication apparatus 7 is located from other factories, and the identifier and the identification information are referred by the processor 700.

When an output etc. are transmitted from each of the sensor units 1, 5a, 5b along with the identification information thereof, the communication apparatus 7 configured in this way receives the output etc. by the corresponding communication device 701. Each time the communication apparatus 7 receives these, the communication apparatus 7 transmits these via the public telecommunication network N towards the server apparatus 8 in association with an identifier for distinguishing the communication apparatus 7 itself from the other communication apparatus 7 or identification information for identifying the factory F.

A server computer is used for the server apparatus 8, and the server apparatus 8 is provided with a control section 80, a storage section 81 and a communication section 82. In Embodiment 5, the server apparatus 8 is explained as one server computer, but the server apparatus 8 may be configured as a plurality of distributed server computers. For example, the server apparatus 8 may be realized by a server computer which performs a process for each area of the corresponding factory F, by a server computer which performs the abnormality detection, and by a server computer which performs a below-described learning.

The control section 80 is provided with a CPU, a built-in ROM and a RAM to control each composition part. A non-volatile memory such as a hard disk or a flash memory is used for the storage section 81. The storage section 81 stores an abnormality detection program 8P and a database DB storing an output sent from each sensor. Note that the database DB may be constructed in an external storage device different from the server apparatus 8. Moreover, the storage section 81 stores position data of factories etc. in association with information for identifying the factories respectively. For example, the information is information showing factories and each production line L1 in each factory, GPS coordinates of the production device M1, or coordinates of the fixed station concerning the position determination or identification information assigned to the RFID concerning the position determination as well as layouts of the respective factories F. The storage section 81 stores identification information of equipment such as the production line L1, the production device M1 arranged in the factory F according the layout and also stores position data thereof. Moreover, the storage section 81 stores a program for server corresponding to the terminal device 9 to notify an abnormality to a program for terminal of the terminal device 9. Note that the program for server may be a Web server program. Based on the abnormality detection program 8P, the control section 80 functions as a detection section which receives information sent from each sensor unit 1, 5a, 5b and detects an abnormality, and also fulfills a function of notifying (outputting) an abnormality detection to the terminal device 9 of the factory F.

For example, a network card is used for the communication section 82, and the communication section 82 realizes a communication via the public telecommunication network N. The communication section 82 may communicate over the wireless.

The terminal device 9 is a tablet terminal for example and is provided with a control section 90, a storage section 91, a communication section 92, a display section 93 and an operation section 94. Note that the terminal device 9 may be a PC of a desktop type or a laptop type.

The control section 90 is provided with a CPU, a built-in ROM and a RAM to control each composition part. A non-volatile memory such as a hard disk or a flash memory is used for the storage section 91. The storage section 91 stores a program for terminal corresponding to the server apparatus 8. The program for terminal is a web browser program, for example.

For example, a liquid crystal panel is used for the display section 93 and the display section 93 displays information based on the control by the control section 90. For the operation section 94, a mouse or a keyboard, or a touch panel incorporated in the display section 93 is used.

In the abnormality detection system 500 configured in this way, the server apparatus 8, which receives information sent from each sensor unit 1, 5a, 5b via the communication apparatus 7 located in the factory F, detects an abnormality and notifies the detected abnormality to the terminal device 9 used by an operator of the factory F. The configuration of detecting an abnormality by the external server apparatus 8 analyzes each equipment in which a chain is used and further analyzes information on sensor outputs received by a plurality of factories including the factory F and detects various abnormalities by learning with precision.

Figure 18:
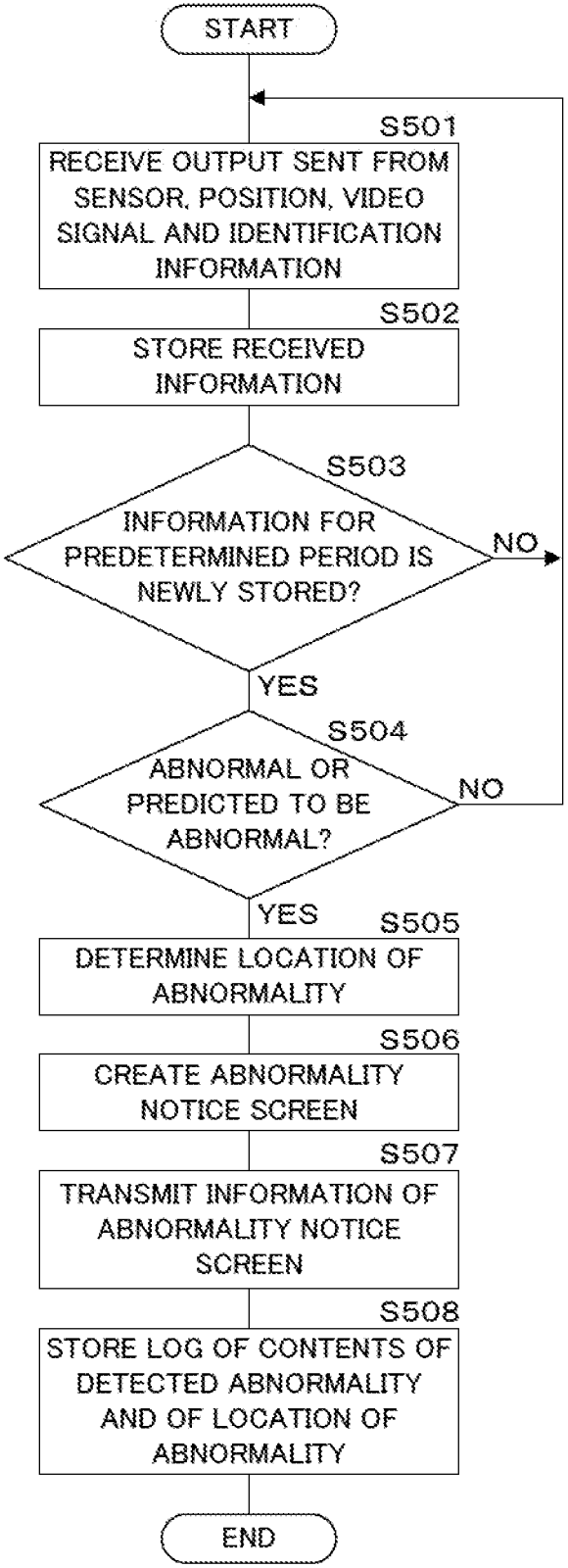
FIG. 18 is a flowchart showing one example of a process procedure of an abnormality detection in Embodiment 5.

FIG. 18 is a flowchart showing one example of a process procedure of an abnormality detection in Embodiment 5. In the server apparatus 8, the control section 80 receives an output sent from each sensor, a position, time information and a video signal which are regularly transmitted from each of the sensor unit 1, the sensor unit 5a and the sensor unit 5b via the communication apparatus 7 (Step S501). At Step S501, the control section 80 receives an identifier of the communication apparatus 7 transmitted from the communication apparatus 7 or identification information for identifying the factory F in association with identification information of the sensor units 1, 5a, 5b for specifying a transmission source of the sensor.

The control section 80 stores the received output etc. in the database DB of the storage section 81 (Step S502). When the control section 80 can receive the information on each output, the position and the video signal along with the time information, the control section 80 stores the information in association with each identification information by factory and by equipment without any change. When the control section 80 cannot receive the information along with the time information, the control section 80 stores the information in association with the identification information in order of reception in time series. In the storage in the storage section 81 at Step S502, the output etc. may be saved without any change and form big data in order to use the output etc. for learning at a step described below.

The control section 80 judges whether or not the information for a predetermined period from a previous time point where the abnormality has been judged is newly stored regarding each output stored in association with each identification information for each factory and also for each equipment (Step S503). When the control section 80 judges that the information for the predetermined period is stored (S503: YES), the control section 80 refers to a feature amount for detecting an abnormality which is stored in the storage section 81 regarding the information of the output etc. which is newly stored, and judges whether or not the output etc. are abnormal or are an output etc. predicted to be abnormal (Step S504). Note that the judgment at Step S504 may be performed using as a trigger a case where there is a predetermined change in the output of each sensor.

When the control section 80 judges that the output etc. are abnormal or are output etc. predicted to be abnormal (S504:

YES), the control section 80 detects an abnormality thereby to determine a location of the abnormality (Step S505). At Step S505, the control section 80 may use a position of each of the sensor units 1, 5*a*, 5*b* corresponding to a timing of the output etc. judged to be abnormal.

The control section 80 creates an abnormality notice screen showing the location of the abnormality determined at Step S505 (Step S506), and transmits information of the created abnormality notice screen from the communication section 82 to the terminal device 9 (Step S507). It is preferable that the abnormality notice screen created at Step S506 includes the contents of the abnormality. Note that at Step S507 the control section 80 may notify the information to a person in charge of the factory F being an object of the abnormality detection by an e-mail, a message, etc.

The control section 80 stores a log of the contents of the detected abnormality and of the location of the abnormality in the database DB of the storage section 81 (Step S508) and ends the process. The control section 80 repeatedly performs the processes of Step S501 to Step S508 after that.

When the control section 80 judges at Step S503 that the information for the predetermined period from the previous time point of the judgment at Step S504 is not stored for each factory and for each equipment (S503: NO), the control section 80 returns the process to Step S501 and continues the reception and storage.

When the control section 80 judges at Step S504 that the output etc. are not abnormal or are not output etc. predicted to be abnormal (S504: NO), the control section 80 returns the process to Step S501 and continues the reception and storage of an output etc. sent from each sensor.

Figure 19:
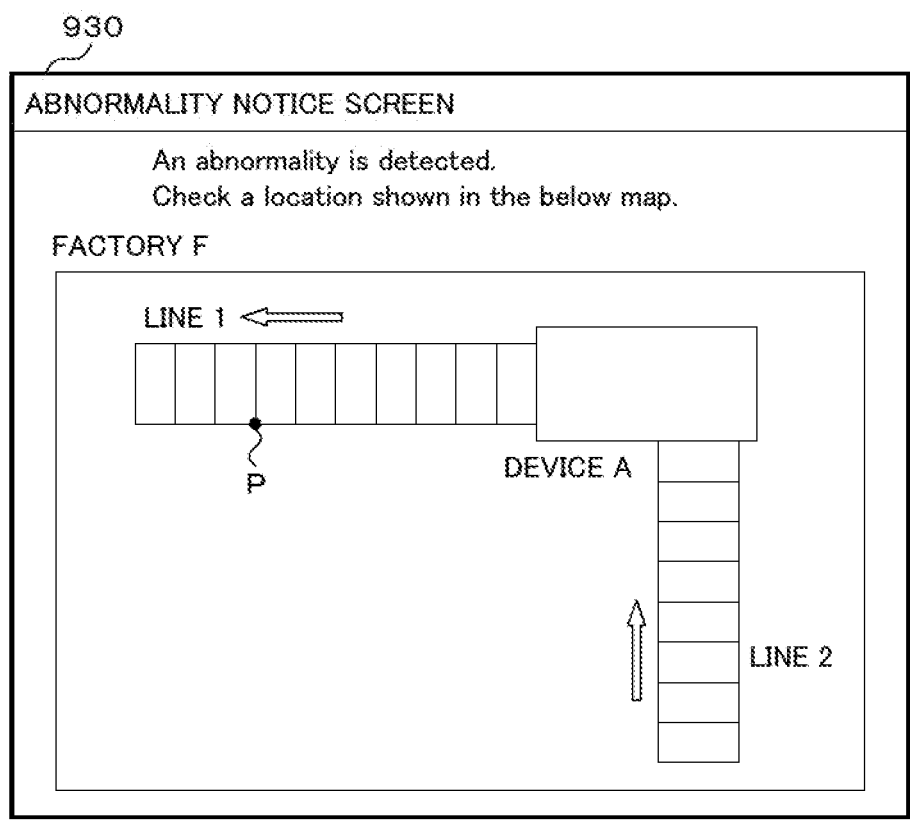
FIG. 19 shows an example of a screen of an abnormality detection displayed on a display section of a terminal device.

FIG. 19 is an example of a screen of an abnormality detection displayed on the display section 93 of the terminal device 9. In the example of the screen shown in FIG. 19, an image showing an arrangement relation of the production line L1 (line 1) and the production device M1 (device A) of the factory F is displayed on an abnormality detection screen 930, and also a location of a detected abnormality is shown with a point P. The location of the abnormality is determined and shown on the layout of the equipment being the object of the abnormality detection, and therefore an operator who receives a notice can determine and check a location which should be suspected to be a location of an abnormality. The similar abnormality detection screen 930 can be similarly realized also by a method of causing a lamp corresponding to each part to illuminate by means of an operation panel, and moreover it can be realized by a sound or an output of a log.

A learning using big data such as an output of each sensor is preferably performed as described below. It is preferable that the contents of a detected abnormality are distinctively displayed on an abnormality notice screen transmitted to the terminal device 9, but an option for feeding back the actual contents of an abnormality and a transmission interface are preferably included. An operator of the factory F who receives an abnormality notice checks whether or not there is an abnormality based on the location of the abnormality determined on the abnormality notice screen, and when the operator can actually check an abnormality or a phenomenon predicted to be abnormal on site, the operator appropriately selects the corresponding contents from the option of the contents of the abnormality shown on the abnormality notice screen and select the transmission interface. Thereby, the contents of the checked abnormality are transmitted to the server apparatus 8. In the server apparatus 8, the output sent from each sensor and the video signal and the like which lead to the abnormality detection are stored, and therefore the learning is repeated using these pieces of information in association with an actual phenomenon (transmitted option). The learning is preferably performed for each factory and for each equipment as much as possible. This is why there is a possibility that a phenomenon of an abnormality varies according to usage conditions even in equipment where the same conveyor chain C1 is used. Thus, the improvement in accuracy of the abnormality detection is expected by learning the abnormality detection on actual site which cannot be known at a test phase by the provider CM of a chain by means of information on each site.

Thus, the sensor unit including a plurality of sensors including the acceleration sensor is attached to a chain such as the conveyor chain C1 which continues moving in the equipment, which can distinctively detect a location (factor) of an abnormality.

Embodiment 6

Figure 20:
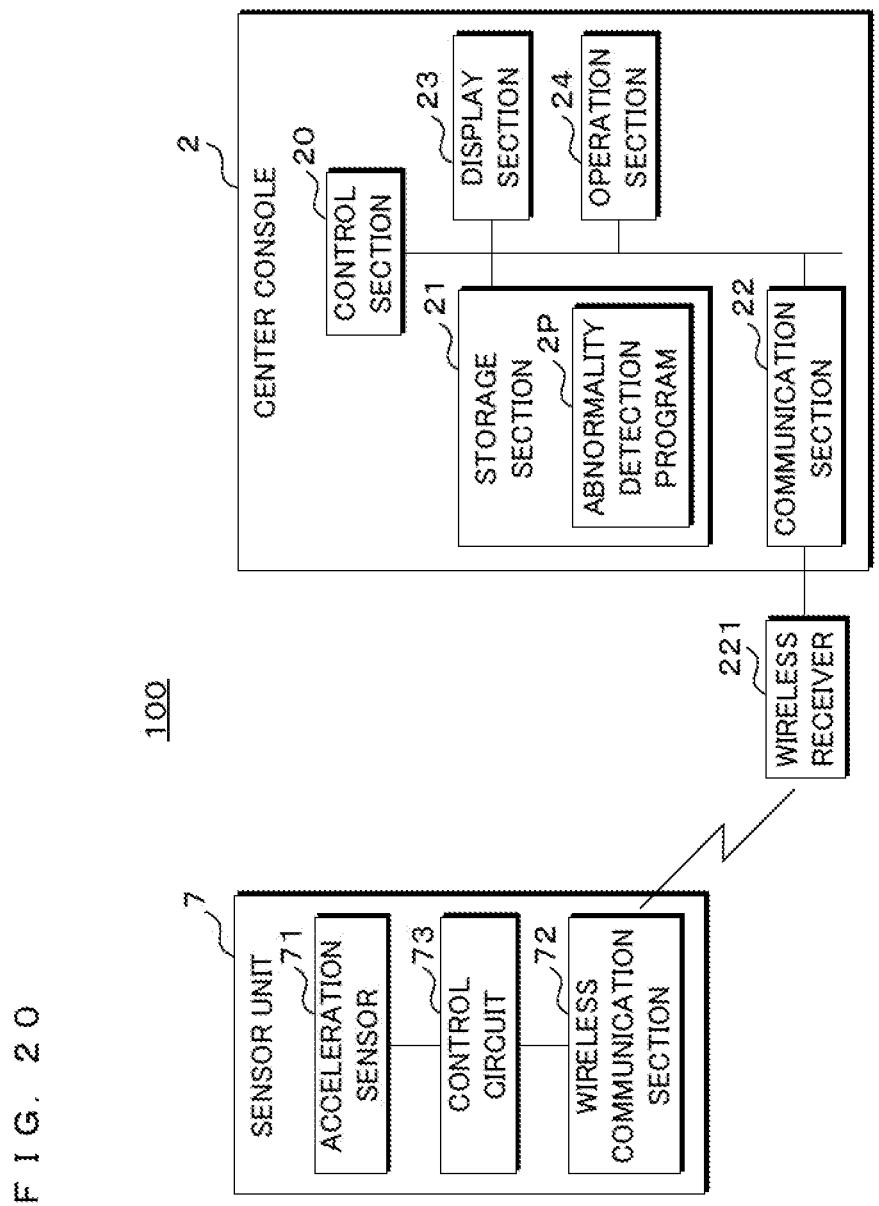
FIG. 20 is a block diagram showing a configuration of an abnormality detection system in Embodiment 6.

FIG. 20 is a block diagram showing a configuration of an abnormality detection system 100 in Embodiment 6. The abnormality detection system 100 in Embodiment 6 comprises a sensor unit 7 embedded in a specific link of a conveyor chain C4, and a center console 2 which controls an operation of the conveying device. The configuration of the abnormality detection system 100 in Embodiment 6 is the same as that of the abnormality detection system 100 in Embodiment 1 except the configuration of the sensor unit 7 itself and a kind of the chain of an object to which the sensor unit 7 is fixed, and therefore the same reference code is assigned to the common component part and a detailed explanation thereof is omitted.

Figure 21:
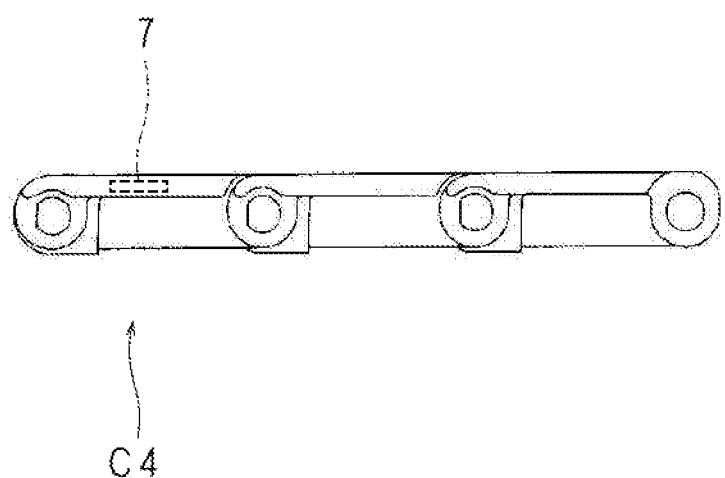
FIG. 21 is a view showing a conveyor chain in Embodiment 6.
Figure 22:
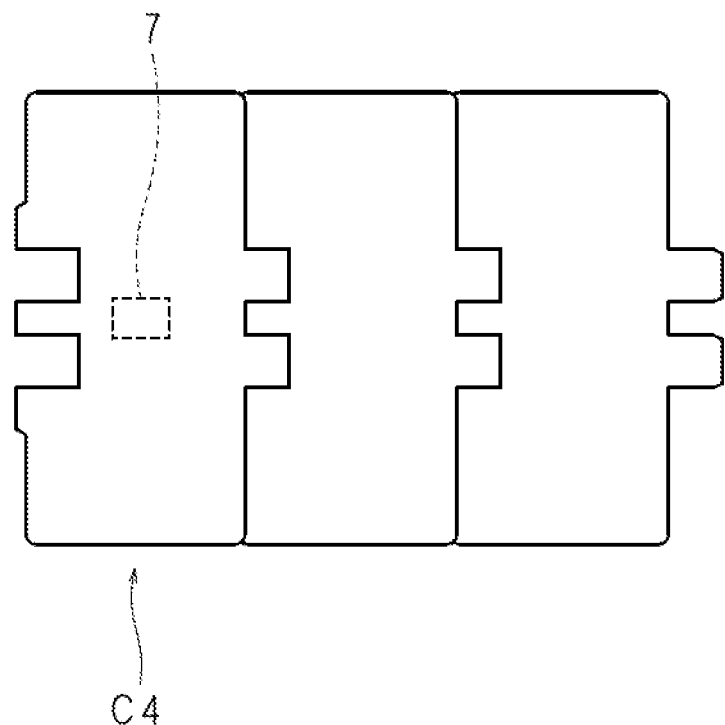
FIG. 22 is a view showing the conveyor chain in Embodiment 6.

The sensor unit 7 is provided with an acceleration sensor 71, a wireless communication section 72 and a control circuit 73 as with the sensor unit 1. The sensor unit 7 is not provided with a case, but is embedded in the link. FIG. 21 and FIG. 22 are views showing the conveyor chain C4 in Embodiment 6. FIG. 21 is a front view and FIG. 22 is a plan view. The conveyor chain C4 is configured by connecting rectangular inks made of a synthetic resin by means of connection pins in an endless manner. As shown in FIG. 21 and FIG. 22, the sensor unit 7 is embedded in the specific link of the conveyor chain C4 in Embodiment 6.

An orthogonal triaxial sensor is used for the acceleration sensor 71 of the sensor unit 7. The acceleration sensor 71 is fixed so as to correspond to three directions of a thickness direction of the link of the conveyor chain C4, and a travel direction and a width direction of the conveyor chain.

The configurations of the wireless communication section 72 and the control circuit 73 are the same as the configuration in the sensor unit 1 shown in Embodiment 1, and therefore a detailed explanation thereof is omitted.

Thus, a method of fixing the sensor unit to the chain varies according to a kind of the chain. The sensor unit may be fixed to a chain plate like Embodiment 1, or the sensor unit may be embedded in a link like Embodiment 6. Also, in the conveying equipment in which the conveyor chain C4 made of the resin is used, the center console 2 receives information sent from the conveyor chain C4, which can detect an abnormality.

In each of Embodiments 1 to 6, the object of the abnormality detection is the production line L1 of the factory. However, needless to say, the object of the abnormality detection is not limited to this. The abnormality detection using the conveyor chains C1 to C4 which nearly always continue traveling as shown in Embodiments 1 to 6 is useful for a conveying equipment which is cannot be basically stopped, and a device and equipment which are provided with a traveling chain but include a portion that a check worker cannot usually enter. The conveying equipment is not only a conveying device of the production line L1 as described above but also an escalator, an elevator, crane equipment, etc. Moreover, the conveying equipment may be applied to a work vehicle etc. such as a device which moves by itself.

Note that Embodiments disclosed in the above are illustrated in all aspects and should be regarded as not being limitative. The scope of the present invention is defined not by the above descriptions of the Embodiments but by the Claims, which intends to include all the meanings equivalent to the Claims and all the modifications within the scope.

It is to be noted that, as used herein and in the appended claims, the singular forms "a", "an", and "the" include plural referents unless the context clearly dictates otherwise.

The invention claimed is:

1. An abnormality detection system, comprising:
    a sensor unit including a sensor, to be fixed to a chain attachable to equipment, and transmitting an output from the sensor; and
    a communication apparatus receiving the output from the sensor unit,
    wherein
    the sensor is an acceleration sensor or an angular velocity sensor,
    the sensor unit comprises a wireless communication section transmitting data including the output from the sensor,
    the communication apparatus comprises:
        a communication section which receive the data including the output transmitted from the sensor unit;
        a detection section which detects an abnormality of the chain and the equipment or an abnormality of the equipment based on the output; and
        a determining section which determines a location of the abnormality of the chain and the equipment in which the chain is attached or a location of the abnormality of the equipment, based on a position of a part fixed with the sensor unit in the equipment, the position changes with moving of the chain.

2. The abnormality detection system according to claim 1, wherein
    the sensor unit further comprises a position-data obtaining section which obtains position data for determining the position, and transmits data including the output and the position data obtained by the position-data obtaining section.

3. The abnormality detection system according to claim 1, further comprising an abnormality output section which outputs an abnormality detected by the detection section in association with a location in the equipment determined by the determining section by means of light or sound.

4. The abnormality detection system according to claim 1, further comprising an additional sensor unit including a sensor, to be fixed to a part not moved in the equipment, and transmitting an output from the sensor,
    wherein
    the sensor is an acceleration sensor or an angular velocity sensor,
    the additional sensor unit comprises a wireless communication section transmitting data including the output from the sensor,
    the detection section of the communication apparatus compares the output transmitted from the sensor unit fixed to the chain and the output transmitted from the additional sensor unit, and detects an abnormality of the chain or the other part, with distinguishing a location of the abnormality.

5. The abnormality detection system according to claim 4, wherein the part to be fixed with the additional sensor unit is a sprocket wheel which drives the chain.

6. The abnormality detection system according to claim 4, wherein
    the detection section of the communication apparatus compares time distribution of the output transmitted from the sensor unit and time distribution of the output transmitted from the additional sensor unit, and detects an abnormality based on the comparison result.

7. The abnormality detection system according to claim 4, wherein
    the detection section of the communication apparatus compares amplitude of the output transmitted from the sensor unit and amplitude of the output transmitted from the additional sensor unit, and detects an abnormality based on the comparison result.

8. The abnormality detection system according to claim 1, wherein
    the sensor unit are provided with both of an acceleration sensor and an angular velocity sensor, and
    the detection section of the communication apparatus detects an abnormality based on an output from the acceleration sensor and on an output from the angular velocity sensor.

9. The abnormality detection system according to claim 1, wherein
    the sensor unit further comprises a strain detection section which detects a strain of the chain, and
    the detection section of the communication apparatus detects an abnormality based on an output from the sensor and on an output from the strain detection section.

10. The abnormality detection system according to claim 1, wherein
    the sensor unit further comprises a temperature sensor, and
    the detection section of the communication apparatus detects an abnormality based on an output from the sensor and on an output from the temperature sensor.

11. The abnormality detection system according to claim 1, wherein
    the sensor unit further comprises an image sensor located towards outside, and
    the detection section of the communication apparatus detects an abnormality based on an output from the sensor and on an image sent from the image sensor.

12. The abnormality detection system according to claim 1, wherein
    the sensor unit further comprises a sound sensor, and
    the detection section of the communication apparatus detects an abnormality based on an output from the sensor and on an output sent from the sound sensor.

13. The abnormality detection system according to claim 3, wherein
    the abnormality output section includes a display and the display displays image indicating the abnormality detected by the detection section and the determined location in the equipment.

14. An abnormality detection system, comprising:
    a sensor unit including a sensor, to be fixed to a chain that is to be attached to equipment, and transmitting an output from the sensor; and a communication apparatus receiving the output from the sensor unit, wherein the sensor is an acceleration sensor or an angular velocity sensor, the sensor unit comprises:

a detection section which detects an abnormality of the chain and the equipment or an abnormality of the equipment based on the output from the acceleration sensor or the angular velocity sensor;

a determining section which determines a location of the abnormality of the chain and the equipment in which the chain is attached or a location of the abnormality of the equipment, the location of the abnormality being detected by the detection section in the equipment, based on a position of a part where the sensor unit is fixed to the moving chain in the equipment in each time point;

a wireless communication section transmitting the abnormality and the determined location of the abnormality when the abnormality is detected by the detection section.

15. An abnormality detection method, comprising processes of:

obtaining an output transmitted from a sensor unit fixed to a chain attached to equipment, the output being sent from a sensor which is provided to the sensor unit, and which is an acceleration sensor or an angular velocity sensor;

detecting an abnormality of the chain and the equipment or an abnormality of the equipment based on the obtained output;

determining a location of the detected abnormality of the chain and the equipment in which the chain is attached or a location of the detected abnormality of the equipment, based on a position of a location where the sensor unit is fixed in the equipment in each time point; and outputting the detected abnormality in association with the determined location.

16. A chain fixed to equipment, the chain comprises:

a sensor which is an acceleration sensor or an angular velocity sensor;

a position-data obtaining section which obtains position data for determining its own position; and a processing section which stores or outputs outwards an output sent from the sensor in association with the position data, wherein the chain is configured to detect an abnormality of the chain and the equipment or an abnormality of the equipment, based on the output from the sensor and determine a location of the detected abnormality of the chain and the equipment in which the chain is attached or a location of the detected abnormality of the equipment.

* * * * *